(12) United States Patent
Drohan

(10) Patent No.: US 8,959,835 B2
(45) Date of Patent: Feb. 24, 2015

(54) WINDOW UNIT

(75) Inventor: Robert Steven Drohan, Worksop (GB)

(73) Assignee: Graham Midgley, West Yorkshire (GB)

( * ) Notice: Subject to any disclaimer, the term of this patent is extended or adjusted under 35 U.S.C. 154(b) by 0 days.

(21) Appl. No.: 13/809,250

(22) PCT Filed: Jul. 6, 2011

(86) PCT No.: PCT/GB2011/001021
§ 371 (c)(1),
(2), (4) Date: Jan. 9, 2013

(87) PCT Pub. No.: WO2012/004563
PCT Pub. Date: Jan. 12, 2012

(65) Prior Publication Data
US 2013/0111814 A1    May 9, 2013

(30) Foreign Application Priority Data

Jul. 9, 2010  (GB) .................................. 1011556.6
Feb. 4, 2011  (GB) .................................. 1101922.1

(51) Int. Cl.
*E06B 7/096*     (2006.01)
*E06B 3/67*      (2006.01)
(Continued)

(52) U.S. Cl.
CPC .............. *E06B 7/096* (2013.01); *E06B 3/6722* (2013.01); *E06B 7/30* (2013.01); *E06B 9/40* (2013.01); *G02B 26/02* (2013.01); *E06B 3/5892* (2013.01); *E06B 2009/2405* (2013.01);
(Continued)

(58) Field of Classification Search
USPC .............. 49/38, 61, 62, 63, 64, 65, 168, 169, 49/171, 163
See application file for complete search history.

(56) References Cited

U.S. PATENT DOCUMENTS 545,655 A * 9/1895 Jones ........................... 160/239
2,142,822 A * 1/1939 Moore ......................... 160/120
(Continued)

FOREIGN PATENT DOCUMENTS

GB          1296594      11/1972
GB          1524165 A     9/1978
(Continued)

*Primary Examiner* — Katherine Mitchell
*Assistant Examiner* — Justin Rephann
(74) *Attorney, Agent, or Firm* — Oliff PLC

(57) ABSTRACT

A window unit (102), comprising: a first sheet (301); a second sheet portion (304); a third sheet portion (308); and an actuation means. The first sheet (301) defines first high transmittance regions (302A, 302B) and first low transmittance regions (303A, 303B). The second sheet portion (304) is positioned substantially parallel to the first sheet, and defines second high transmittance regions (306A, 306B) and second low transmittance regions (307A, 307B). The third sheet portion (308) is positioned substantially parallel to the second sheet portion, and defines third high transmittance regions (309A, 309B) and third low transmittance regions (310A, 310B). The actuation means (507, 523, 524) is configured to simultaneously move the second sheet portion and the third sheet portion from an open configuration, to a closed configuration. In the open configuration the second and third high transmittance regions are aligned with the first high transmittance regions. In the closed configuration, the second high transmittance regions are not aligned with the first high transmittance regions and the third high transmittance regions are not aligned with the first or second high transmittance regions.

23 Claims, 24 Drawing Sheets

(51) Int. Cl.
  *E06B 7/30* (2006.01)
  *E06B 9/40* (2006.01)
  *G02B 26/02* (2006.01)
  *E06B 3/58* (2006.01)
  *E06B 9/24* (2006.01)

(52) U.S. Cl.
  CPC  *E06B 2009/2423* (2013.01); *E06B 2009/2452* (2013.01); *E06B 2009/2458* (2013.01); *E06B 2009/405* (2013.01)
  USPC .................................................. 49/63; 49/65

(56) References Cited

U.S. PATENT DOCUMENTS

| | | | | |
|---|---|---|---|---|
| 2,280,358 A * | 4/1942 | Chester | ........................ | 160/120 |
| 2,549,167 A * | 4/1951 | Brubaker | ...................... | 359/596 |
| 3,444,919 A * | 5/1969 | Karoll | ........................... | 160/184 |
| 3,564,770 A * | 2/1971 | Korbelic | ........................... | 49/38 |
| 4,273,099 A * | 6/1981 | Morgan | ........................ | 126/625 |
| 4,418,739 A * | 12/1983 | Woolnough et al. | ........... | 160/120 |
| 4,644,687 A | 2/1987 | Liou | | |
| 4,766,941 A * | 8/1988 | Sloop et al. | ................... | 160/241 |
| 4,813,198 A | 3/1989 | Johnston et al. | | |
| 5,249,616 A * | 10/1993 | Yen | ................................ | 160/98 |
| 5,538,065 A * | 7/1996 | G eraud | ......................... | 160/85 |
| 5,566,736 A | 10/1996 | Crider et al. | | |
| 5,940,216 A | 8/1999 | Gibbs | | |
| 5,960,847 A * | 10/1999 | Crider et al. | ................ | 160/121.1 |
| 6,094,306 A * | 7/2000 | Jain | ................ | 359/568 |
| 6,138,738 A * | 10/2000 | Moller et al. | ................... | 160/98 |
| 6,138,739 A * | 10/2000 | Crider et al. | ................ | 160/273.1 |
| 6,189,592 B1 * | 2/2001 | Domel | ......................... | 160/85 |
| 6,666,251 B2 * | 12/2003 | Ikle | ............................ | 160/120 |
| 6,672,361 B2 * | 1/2004 | Fransen | ........................ | 160/85 |
| 6,807,772 B2 * | 10/2004 | Halter | ............................ | 49/39 |
| 6,817,401 B2 * | 11/2004 | Sun et al. | ...................... | 160/107 |
| 7,128,121 B2 * | 10/2006 | Nien | ........................ | 160/121.1 |
| 7,128,125 B2 * | 10/2006 | Harbison | ................... | 160/273.1 |
| 7,267,156 B2 * | 9/2007 | Byeon | ........................ | 160/121.1 |
| 7,281,561 B2 * | 10/2007 | Anderson et al. | .......... | 160/121.1 |
| 7,806,160 B2 * | 10/2010 | Byeon | ............................ | 160/85 |
| 7,828,037 B2 * | 11/2010 | Crider | ........................ | 160/121.1 |
| 8,439,099 B1 * | 5/2013 | Crider | ........................ | 160/121.1 |
| 8,550,142 B2 * | 10/2013 | Gaskill et al. | .............. | 160/121.1 |

FOREIGN PATENT DOCUMENTS

| | | |
|---|---|---|
| GB | 2241725 A1 | 9/1991 |
| NL | 2000353 C2 | 6/2008 |
| WO | 2007084393 A2 | 7/2007 |

* cited by examiner

WINDOW UNIT

BACKGROUND OF THE INVENTION

1. Field of the Invention

The present invention relates to a window unit.

2. Description of the Related Art

In locations such as hospitals, it is known to have doors with window units that contain a mechanism allowing vision through the window to be temporarily obscured and so provide privacy. One such type of window unit comprises a pair of static outer panes and a slidable third pane sandwiched between the outer pair. The third pane and one of the outer panes are each provided with a series of horizontal opaque stripes. The third pane is manually moveable (by a cam mechanism) between an open position and a closed position. In the open position, its opaque stripes are aligned with those of the outer pane to allow viewing through the window. In the closed position, its opaque stripes are aligned with transparent stripes of the outer pane to prevent viewing through the window.

One problem with this arrangement is that weight of the third pane limits the size (i.e. height and width) of the window unit that may practically be produced or operated manually.

A second problem relates to the limited proportion of the "open" area of the window. i.e. the area of the window through which a person may see is limited. Ideally, the whole of the window area of the window unit would be transparent when the unit is in its open configuration. However, for such an application it is necessary to provide an overlap of the two sets of opaque stripes in order to ensure privacy when the window unit is in its closed configuration. Consequently, the proportion of the window area that is "open" is less than 50%.

BRIEF SUMMARY OF THE INVENTION

According to an aspect of the present invention, there is provided a window unit as claimed in claim 1.

DETAILED DESCRIPTION OF THE PREFERRED EMBODIMENTS

FIG. 1

Figure 1:
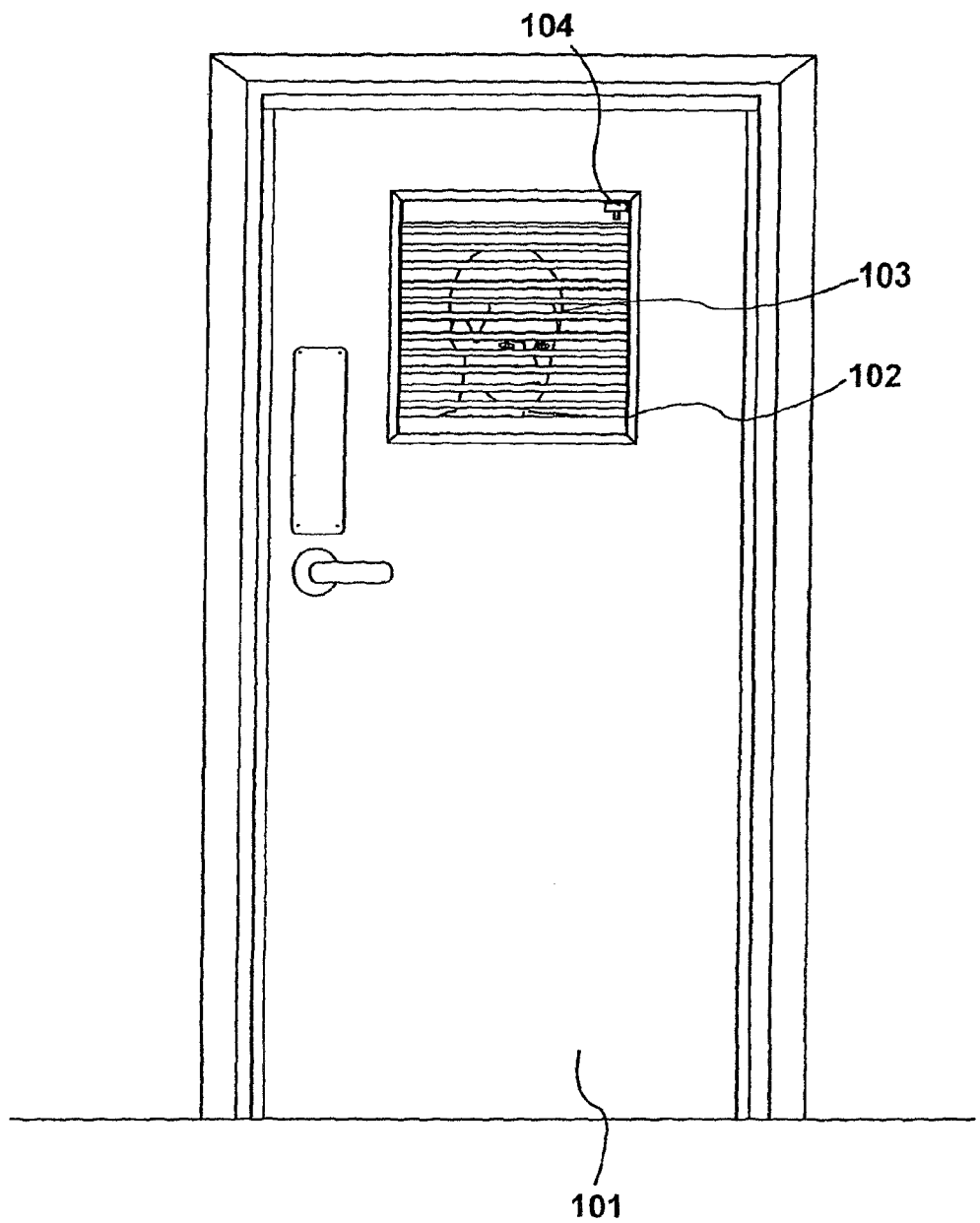
FIG. 1 shows a door 101 comprising a window unit 102, embodying the present invention.

A door 101 comprising a window unit 102, embodying the present invention, is shown in FIG. 1. The window unit 102 is shown in FIG. 1 in an open configuration, and consequently the transmittance of light through the window is relatively high when compared to the window in its closed configuration.

In the present embodiment, the window unit 102, when in its open configuration, defines a plurality of transparent portions in the form of transparent horizontal stripes, alternating with non-transparent portions in the form of non-transparent horizontal stripes. Consequently, a person 103 is able to see through the window unit 102, when in the open configuration.

The window unit 102 has a handle 104, which may be operated to place the window unit into its closed configuration. In the present embodiment, this is achieved by pushing the handle 104 vertically.

FIG. 2

Figure 2:
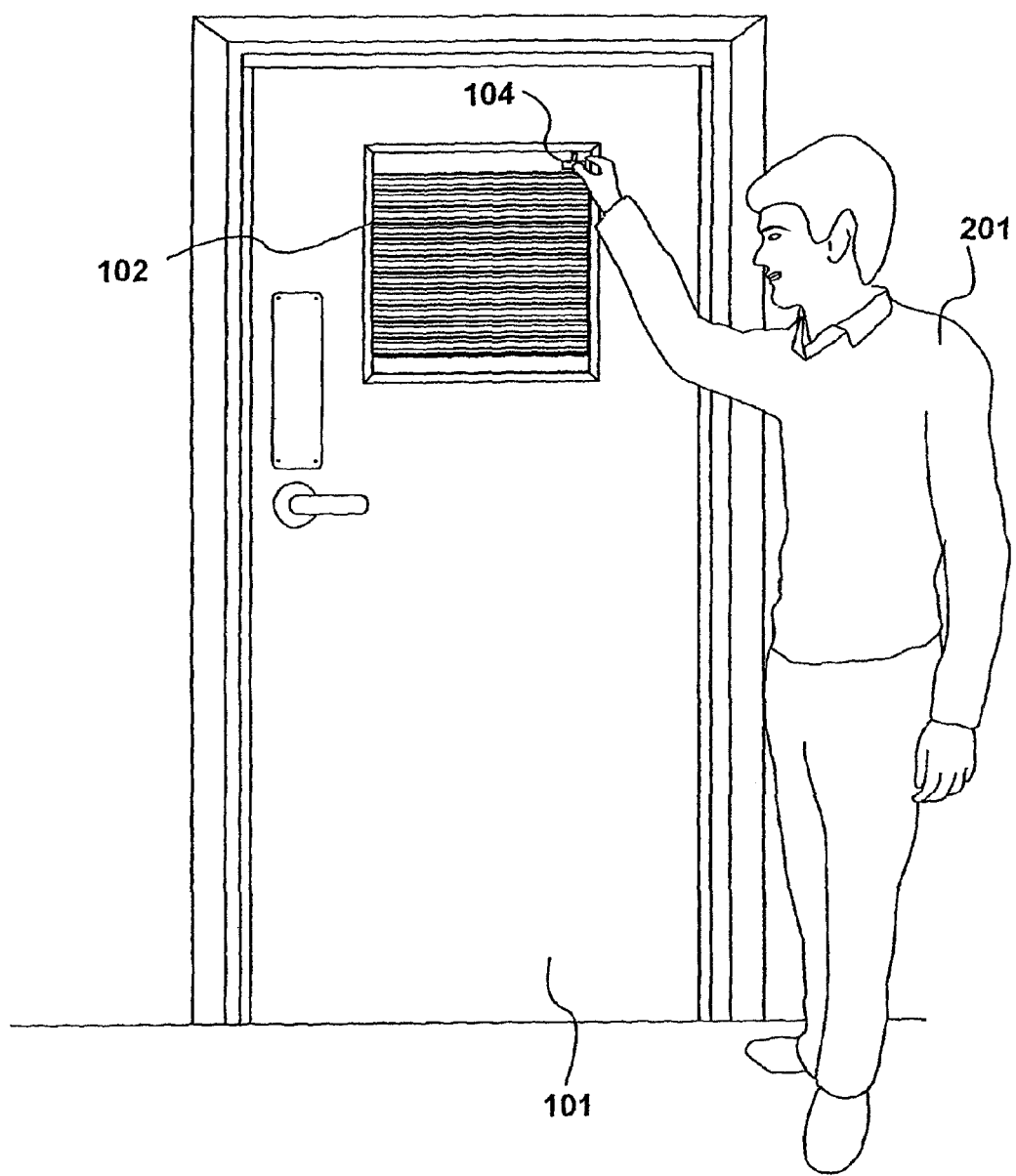
FIG. 2 shows the door 101 with the window unit 102 in its closed configuration.

The door 101 and window unit 102 is shown again in FIG. 2 after a person 201 has pushed the handle 104 downwards in order to place the window unit 102 in its closed configuration. Consequently, the person 103 (previously shown in FIG. 1) can no longer see, or be seen, through the window unit.

Figure 3A:
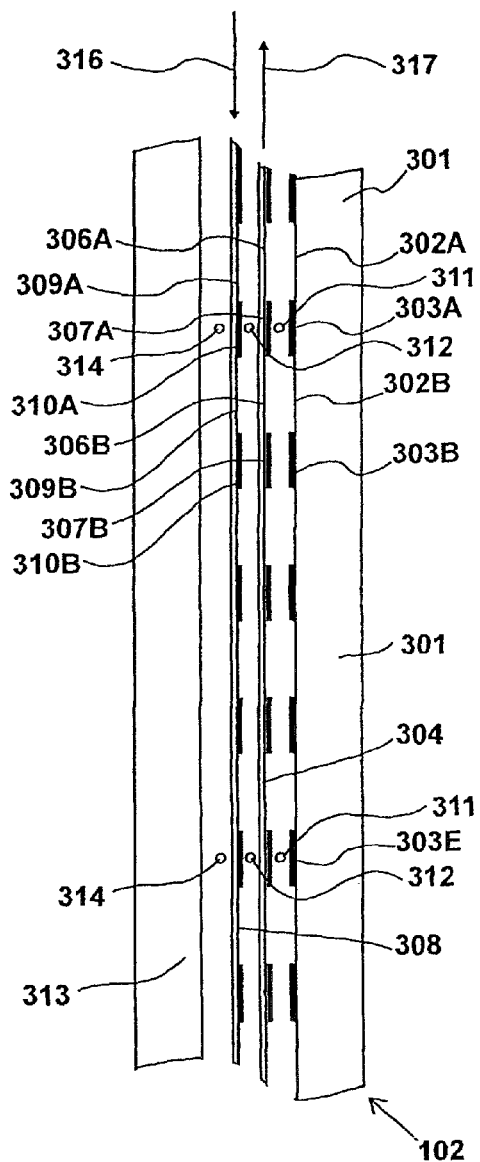
FIG. 3A shows a middle portion of the window unit 102 when the window unit is in its open configuration.
Figure 3B:
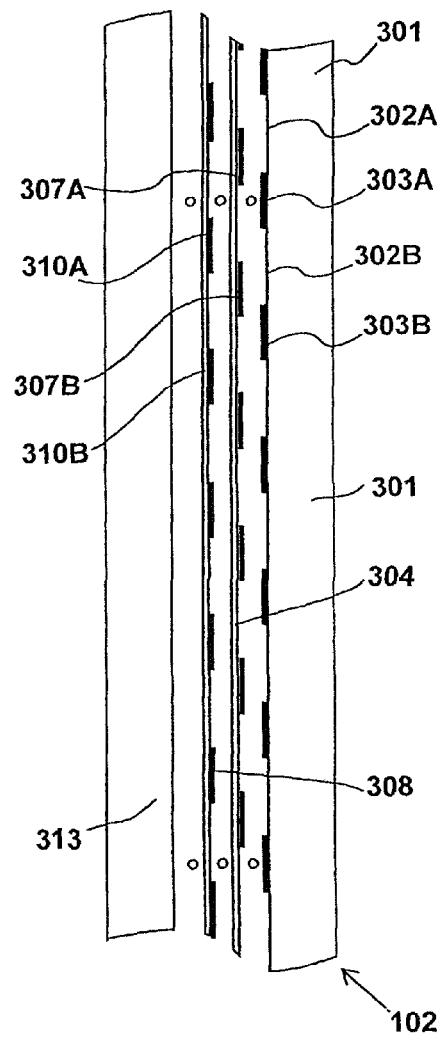
FIG. 3B shows a middle portion of the window unit 102 when the window unit is in a closed configuration.

FIGS. 3A and 3B

A middle portion of the window unit 102 is shown in cross-section in FIG. 3A, with the window unit in its open configuration. Similarly, a central portion of the window unit 102 is shown in FIG. 3B in its closed configuration.

The window unit 102 comprises a first sheet 301 defining high transmittance regions, such as regions 302A and 302B as well as low transmittance regions, such as regions 303A and 303B. The high transmittance regions are regions in which light incident upon the first sheet 301 has a relatively high transmittance through the sheet when compared to the transmittance through the low transmittance regions, such as regions 303A and 303B. In the present embodiment, the high transmittance regions are transparent regions, while the low transmittance regions are non-transparent regions.

In the present embodiment, the first sheet 301 is formed of a pane of toughened glass on which the non-transparent regions (such as 303A and 303B) have been formed, and the non-transparent regions define a series of equally spaced horizontal stripes of an opaque paint.

In the present example, each stripe, such as non-transparent regions 303A and 303B, has a width of 14 mm (millimeters) and is spaced from its neighbouring non-transparent regions by a transparent stripe (such as 302A and 302B having a width of 23.5 mm.

The window unit 102 also comprises a second sheet portion 304 positioned substantially parallel to the first sheet 301. The second sheet portion 304 defines a second set of high transmittance regions, including regions 306A and 306B, and a second set of low transmittance regions including regions 307A and 307B. In the present embodiment, the high transmittance regions of the second sheet 304 are transparent regions, and the low transmittance regions are non-transparent regions. The non-transparent regions of the second sheet portion 304 are formed in the same manner as the first non-transparent regions on the first sheet 301, and they also have a similar format. i.e., the second set of transparent regions also defines a series of parallel horizontal stripes.

The window unit 102 further comprises a third sheet portion 308. The third sheet portion is positioned substantially parallel to the second sheet portion 304 and defines a third set off high transmittance regions and low transmittance regions. In the present embodiment, the third sheet portion 308 has a similar form to the second sheet portion 304 and so its high transmittance regions, such as regions 309A and 309B are transparent regions and its low transmittance regions, such as regions 310A and 310B, are non-transparent regions. Also, the transparent regions and non-transparent regions of the third sheet portion 308 have the same format as the transparent regions and non-transparent regions of the second sheet portion 304. Thus, the non-transparent regions of the first sheet 301, the second sheet portion 304 and the third sheet portion 308 may all be aligned, thereby aligning the transparent regions of the first sheet 301, the second sheet portion 304 and the third sheet portion 308, as shown in FIG. 3A. As a consequence, light passing through the window unit 102 perpendicular to the first sheet 301, that passes through the transparent regions (such as 302A and 302B), is able to pass through the corresponding transparent regions of the second sheet portion 304 and third sheet portion 308.

In the present embodiment, the second sheet portion 304 and third sheet portion 308 are each formed of a sheet of clear and colourless polyester film (such as that sold under the trademark Mylar). The film has a thickness of between 100 and 200 microns (100 and 200 micrometers), and in the present embodiment, the second sheet portion and third sheet portion has a thickness of 175 microns (175 micrometers). However, an alternative embodiment is envisaged in which the sheet has a thickness of approximately 125 microns (125 micrometers).

A gap of approximately 0.5 mm is provided between the first sheet 301 and the second sheet portion 304, while a similar gap of 0.5 mm is provided between the second sheet portion 304 and the third sheet portion 308. In addition, the non-transparent regions on the first sheet 301 are provided on the face of the sheet that faces towards the second and third sheet portions. Similarly, the non-transparent regions on the third sheet portion 308 are provided on its face that faces towards the second sheet portion 308 and the first sheet 301. Consequently, the three sets of non-transparent regions are spaced apart by only approximately 1 mm. Such a small spacing allows light to pass through the window unit 102 in the open configuration at relatively wide angles. In the present embodiment, the width and spacing of the non-transparent regions allows light to pass through the window unit 102 at angles of up to approximately 87° from the horizontal.

The window unit 102 also comprises a fourth sheet 313 arranged parallel to the first sheet 301 such that the second sheet portion 304 and third sheet portion 308 are generally arranged between the two sheets 301 and 313. As will be described in detail below, the fourth sheet 313 and the first sheet 301 are mounted within a structure that fixes their spacing relative to each other. In the present embodiment, the fourth sheet 313 is completely transparent, being formed of a sheet of clear glass.

As illustrated in FIG. 3A, the window unit 102 also comprises a plurality of filaments 311 which extend along the gap between the first sheet 301 and the second the sheet portion 304 to ensure the gap is maintained between these two layers all along the length of the gap. The filaments 311 extend into the page as shown in FIG. 3A and therefore extend parallel to and adjacent to selected ones of the non-transparent regions of the first sheet 301. In the present example, a first filament 311 extends alongside non-transparent region 303A while a second fibre 311 extends alongside non-transparent region 303E.

Similarly, to maintain the spacing between the second sheet portion 304 and the third sheet portion 308 a second set of filaments 312 extend between these two layers parallel to the first set of filaments 311.

A third set of filaments 314 extend along the gap between the third sheet portion 308 and fourth sheet 313 to maintain the spacing between the third sheet portion 308 from the fourth sheet 313.

In the present embodiment, each of the filaments 311, 312 and 314 are formed of a single fibre formed of nylon, such as that commonly used as fishing line.

As will be described in detail below, the second sheet portion 304 and third sheet portion 308 are configured to be movable along their lengths in the vertical direction. In the present embodiment, a mechanism is provided within the window unit 102 which moves the second sheet portion 304 in one direction and simultaneously moves the third sheet portion 308 in the opposite direction. That is, when the second sheet portion is moved vertically upwards, as indicated by arrow 315, the third sheet portion 308 is moved vertically downwards as indicated by arrow 316. The second sheet portion 304 and third sheet portion 308 are moved in this way, in order to position the sheet portions 304, 308 in the closed configuration as shown in FIG. 3B. Thus, in FIG. 3B the non-transparent regions, such as regions 307A and 307B on second sheet portion 304 have been moved vertically upwards with respect to the non-transparent regions, such as regions 303A and 303B on the first sheet 301. Similarly, the non-transparent regions, such as regions 310A and 310B, of the third sheet portion 308 have been moved vertically downwards. In this way, a non-transparent region of the second sheet portion 304 along with a non-transparent portion of the second sheet portion 308 may be repositioned such that they effectively cover the transparent regions of the first sheet 301. For example, the non-transparent portion 307B of sheet portion 304 and the non-transparent portion 310A of third sheet portion 308 have been repositioned such that they substantially cover the transparent region 302B of the first sheet 301.

It may be noted that the non-transparent regions have a width that is more than half of the width of the transparent regions, and consequently the non-transparent regions of each of the layers may be arranged to overlap with the non-transparent regions of the other two layers. For example, the non-transparent region 310A effectively overlaps with non-transparent region 303A of the first sheet 301 and the non-transparent region 307B of the second sheet portion 304. In the present embodiment, the transparent regions have a width of 22.5 mm while the non-transparent regions have a width of 15 mm, thereby providing a 2.5 mm overlap of the non-transparent regions.

Conventional privacy window units have two sheets of glass. Each sheet defines horizontal, opaque and equally spaced stripes, which alternate with stripes of clear glass. The opaque stripes have a width that is greater than the width of clear stripes so that when the window unit is placed in a closed configuration the opaque stripes of one sheet overlap with the opaque stripes of the other sheet. Consequently, the open area of the conventional window units is less than 50%.

The present window unit 102 has three layers (instead of two) that have alternating transparent and non-transparent stripes. Consequently, it is possible to provide overlap of the non-transparent stripes in the closed configuration, while providing an open area of more than 50%. i.e. it is possible to provide overlap of the non-transparent stripes in the closed configuration, even though the width of the non-transparent stripes is much less than that of the transparent stripes. For example, in the present embodiment, the transparent stripes have a width of 22.5 mm while the opaque stripes have a width of 15 mm. Thus, when the window unit 102 is in its open configuration approximately 60% (=22.5/(22.5+15)) of the window area is open.

In the above described embodiment, the low transmission regions are formed of opaque paint applied to the first sheet 301, second sheet portion 304 and third sheet portion 308. In one alternative embodiment, the low transmission regions are translucent being formed of a paint allows a portion of light incident on the low transmittance regions to pass through, but which diffuses light so that the window unit provides privacy when in its closed position. In another alternative embodiment, the low transmission regions are formed by applying a rough surface to regions of the three layers (301, 304, 308). The rough surface diffuses light and thereby provides privacy when the window unit is in its closed configuration. The rough surface may be produced by sand blasting, or bead blasting, or by applying strips of a polymeric film having a rough finish. Such film is commercially available having a suitable adhesive pre-applied.

In the present embodiment the filaments 311, 312 and 314 assist with the maintenance of spacing between the first sheet, second sheet portion and third sheet portion. However, in other embodiments these filaments are omitted, and the parallelism of the sheet portions is maintained by keeping the second sheet portion and the third sheet portion in tension between respective pairs of positioning members, such as the guide rods that will be described below with respect to FIG. 5 or the positioning members of FIG. 25.

FIG. 4

Figure 4:
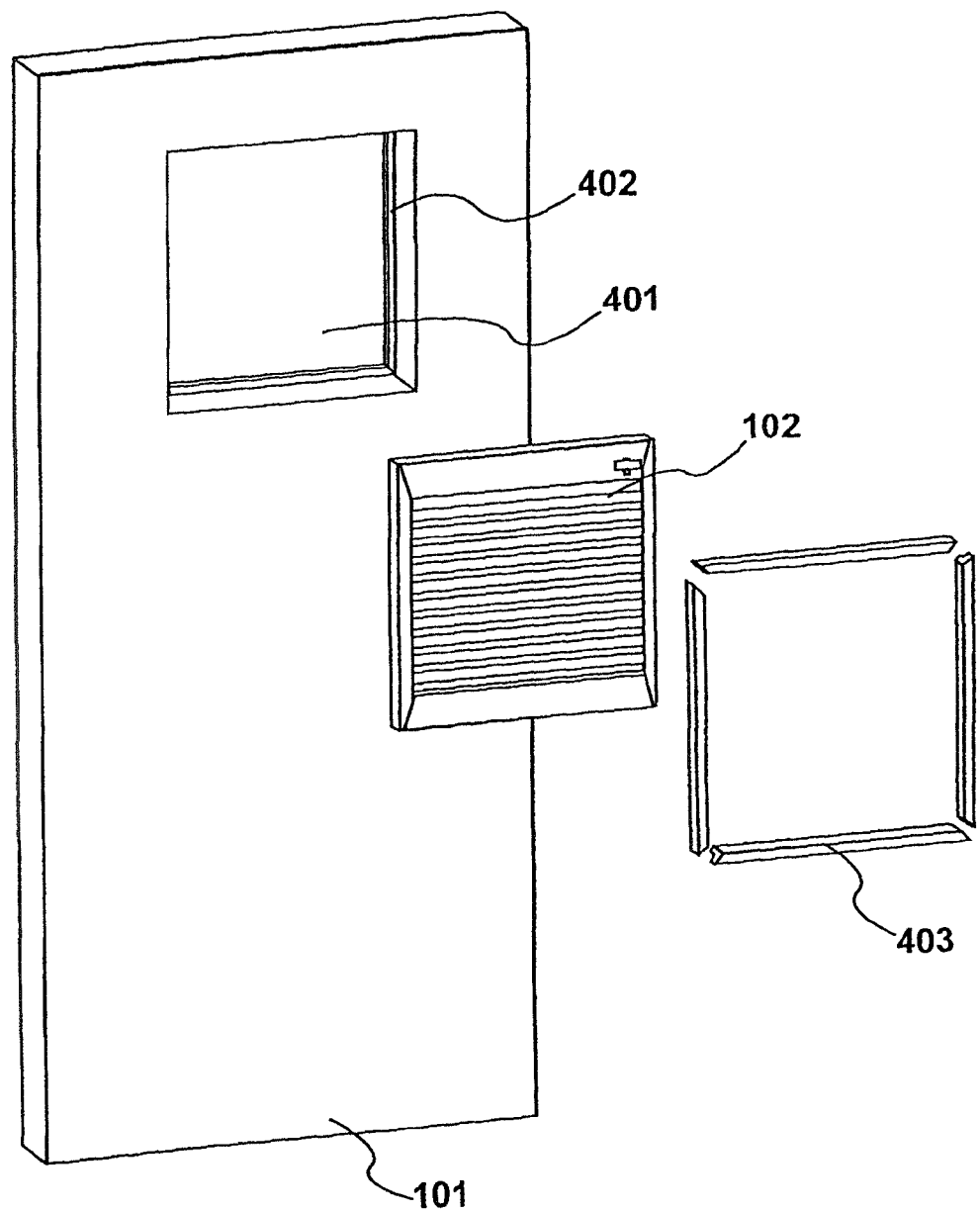
FIG. 4 shows the window unit 102 removed from the door 101.

The assembly of the window unit 102 into the door 101 is illustrated in FIG. 4.

The door 101 is provided with a rectangular hole 401, which in the present embodiment is substantially square. The window unit 102 also has a substantially square shape and is dimensioned to be a good fit within the hole 401. Beading 402 is applied to the door 101 around the perimeter of the hole 401 on one side of the door. The unit 102 is fitted into the hole 401 and then a second set of beading material 403 is fixed to the second side of the door around the perimeter of the hole 401, thereby fixing the window unit 102 in place.

It may be noted that, in the present example, the window unit is located within a door, but in other examples the window unit is located within a wall.

FIG. 5

Figure 5:
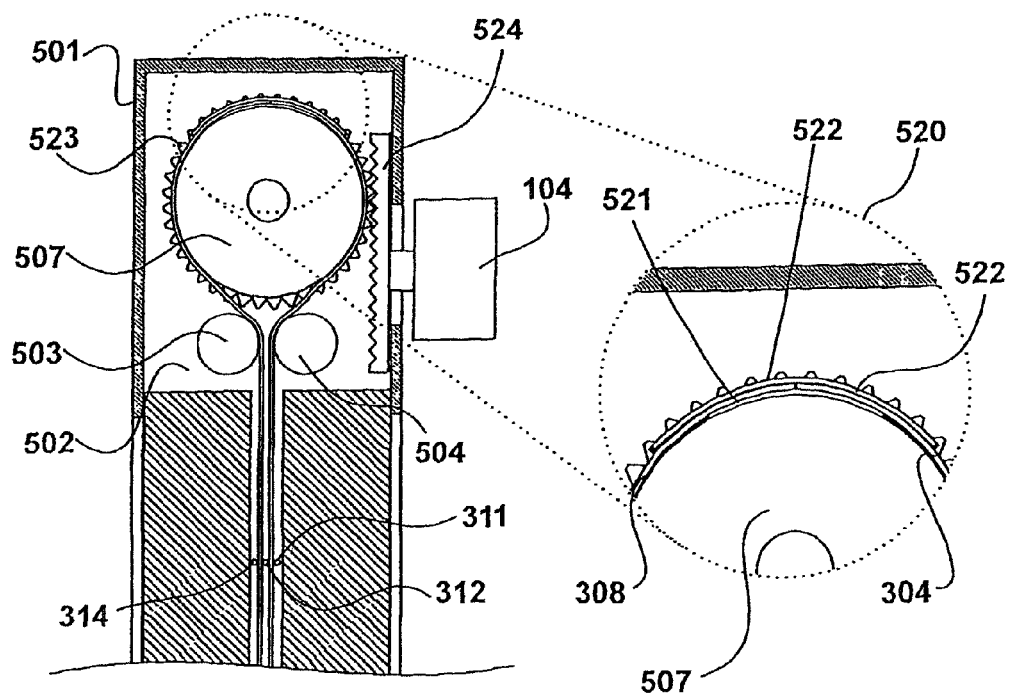
FIG. 5 shows a partial cross-sectional view of the window unit 102.
Figure 5:
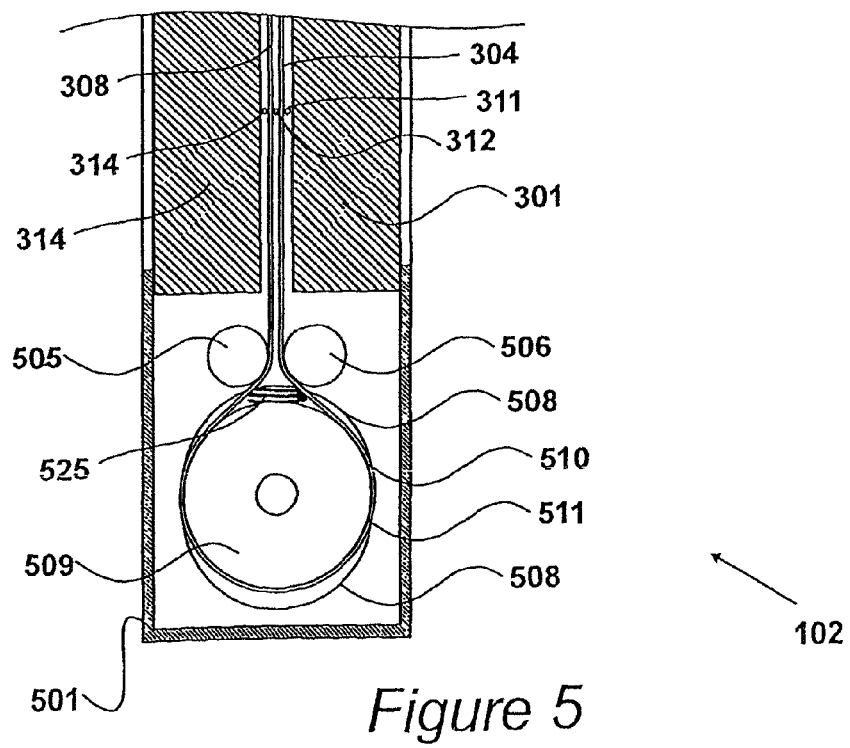

A partial cross-sectional view of the window unit 102 is shown in FIG. 5. A middle portion of the window unit 102 has been omitted to allow the mechanisms at each end of the window unit to be provided in greater detail.

The window unit 102 comprises an outer frame 501 and a pair of inner mounting blocks 502, one of which is shown in FIG. 5. The mounting blocks 502 define recesses for receiving the side edges of the first sheet 301 and the fourth sheet 313 to ensure they are correctly spaced. In addition, the mounting blocks 502 also define holes receiving opposing ends of four positioning members in the form of guide rods 503, 504, 505 and 506. The guide rods extend parallel to the first sheet 301 and fourth sheet 313; two of said guide rods 503 and 504 extending horizontally above the sheets 301 and 313, and the other two guide rods 505 and 506 extending horizontally below the sheets 301 and 313.

The mounting blocks 502 also define a circular bore for receiving a respective one of the two ends of a drive element 507, which extends above and parallel to the guide rods 503 and 504. In the present embodiment, the drive element 507 comprises an upper roller 507 having a cylindrical outer surface. The mounting blocks 502 also define a lower elongated bore 508 that receive a respective end of a guide member 509, which extends below and parallel to the lower guide rods 505 and 506.

In the present embodiment, the second sheet portion 304, the third sheet portion 308 and a connecting portion 511, connecting the second and third sheet portions, are different portions of a single sheet 510 of material. This single sheet of material 510 extends down from the upper roller 507 (as second sheet portion 304), around the guide member 509 (as connection portion 511) and back up to the upper roller 507 (as third sheet portion 308).

The upper ends of the second and third sheet portions 304 and 308 are both attached to the upper roller 507. In FIG. 5, this attachment may most easily be seen in the inset enlarged view shown in the dotted circle 520. The ends of the second sheet portion 304 and the third sheet portion 308 are attached to the upper roller 507 by means of adhesive 521, in the form of a double-sided adhesive tape. A strip of single sided adhesive tape 522 also extends along the butt joint between the ends of the second sheet portion 304 and third sheet portion 308 to ensure their adherence to each other.

The upper roller 507 is mounted to rotate about its axis, and depending upon the direction of rotation the upper roller pulls either the second sheet portion 304 upwards or the third sheet portion 308 upwards. If the second sheet portion 304 is pulled upwards, it pulls on the connection portion 511 (extending around the guide member 509), and in turn, the connection portion pulls the third sheet portion 308 downwards. Alternatively, if the third sheet portion 308 is pulled upwards, it pulls on the connection portion 511, which pulls the second sheet portion 304 downwards.

Thus the sheet of material 510 is forced to move around a circuit, such that the second sheet portion 304 and third sheet portion 308 move parallel to each other but in opposite directions. Thus, the required movements to move the sheet portions into their open configuration of FIG. 3A or alternatively their closed configuration of FIG. 38 are achieved.

It should be noted that as the upper roller 507 is rotated, end portions of the second and third sheet portion 304 and 308 are wound onto or off the cylindrical outer surface of the upper roller 507. Because this surface is cylindrical, the total length of the second and third sheet portions from the upper roller 507 around the circuit defined by the guide rods 503 to 506 and the guide member 509 and back to the upper roller 507 remains constant when the upper roller is rotated. Thus, it is advantageous for the portion of the surface of the upper roller onto which the sheet portions winds and unwinds to be cylindrical. In the present embodiment, the guide member 509 is provided in the form of a lower roller 509 that is mounted within the mounting blocks 502 such that it is able to rotate about its axis. In an alternative embodiment the guide member 509 is not mounted to rotate, but it is provided with a low friction surface to allow the connection portion 511 to slide around it. However, in each case, the effect of the connection portion 511 in combination with the guide member 509 is such that movement of one of the sheet portions (304, 308) causes force to be applied to the other sheet portion (308, 304) to move it in an opposite direction.

In order to cause the rotation of the upper roller 507, the upper roller is provided with a toothed gear wheel 523 (the teeth of which may be seen in FIG. 5). A corresponding toothed rack 524 having teeth engaging the teeth of the gear 523 is mounted to slide within the outer frame 501. The toothed rack 524 is directly connected to the handle 104, such that a user can slide the handle 104 and thereby cause the upper roller 507 to rotate by means of the action of the rack 524 on the toothed gear wheel 523.

The rack and pinion mechanism provided by the toothed rack 524 and gear wheel 523 is one of many different types of actuation means that may be used for simultaneously moving the second sheet portion 304 and the third sheet portion 308 as required. For example, in an alternative embodiment the rack and pinion mechanism is replaced with a lever fixed to the upper roller 507 which extends outwards from the frame 501 to allow a user to push the lever and rotate the upper roller 507. In another embodiment, the toothed gear 523 engages a smaller toothed gear driven by a small direct current electric motor located within the outer frame 501. The electric motor is powered by a rechargeable battery which is itself charged by solar cells mounted within or on the surface of, the widow unit.

In a further alternative embodiment, the upper roller 507 is provided with a gear wheel driven by a chain formed of a flexible cord to which a series of equally spaced beads are fixed. Thus, this is a similar mechanism to that commonly found in roller blinds for adjusting the position of the blind.

As mentioned above, with respect to FIGS. 3A and 3B, the second sheet portion 394 and third sheet portion 308 are arranged parallel to the first sheet 301 with relatively close spacings of less than 1 mm. To achieve accurate spacing of the second sheet portion 304 and third sheet portion 308, the sheet portions extend around the guide rods 504 and 506 and 503 and 505 respectively. i.e., the second sheet portion 304 extends from the upper roller 507 around the upper guide rod 504 along the first sheet 301 down to and around the lower guide rod 506 to the guide member 509. Similarly, the third sheet portion extends from the upper roller 507 around the upper guide rod 503 down to and around the lower guide rod 505 and around the guide member 509. Thus, the second sheet portion 304 extends along a plane defined by a first upper positioning member (i.e. guide rod 504) and a first lower positioning member (i.e. guide rod 506), and the third sheet portion (308) extends along a plane defined by a second upper positioning member (i.e. guide rod 503) and a second lower positioning member (i.e. guide rod 505). Consequently, the second sheet portion 304 is positioned substantially parallel to, and spaced from, said third sheet portion 308 and said first sheet 301.

To ensure that the second sheet portion 304 and third sheet portion 308 are kept straight, they are kept in tension by the action of the guide member 509 which is urged away from the upper roller by means of a compression spring 525 located within the mounting block 502. i.e., any slack in the second sheet portion 304 and third sheet portion 308 is taken up by the compressed spring 525 urging the guide member 509 downwards. In the present embodiment, the spring 525 applies a force to one end of the guide member 509 while a similar spring applies a force to the opposite end of the guide member 509. However, in alternative embodiments alternative spring means are used to apply force to the guide member 509 to maintain the tension in the sheet portions 304 and 308. For example, in one embodiment the spring 525 is replaced by a compressible rubber block, while in another embodiment the spring 525 is replaced by a pneumatic piston arrangement.

In the present embodiment, the positioning members are provided as separate components, in the form of guide rods 503, 504, 505, and 506, to the upper roller 507 and the guide member 509. However, as will be described below with reference to FIGS. 20 to 26, in an alternative preferred embodiment the upper roller and the guide member are themselves each used as a positioning member for ensuring the parallel spacing between the sheet portions and the first sheet.

FIG. 6

Figure 6:
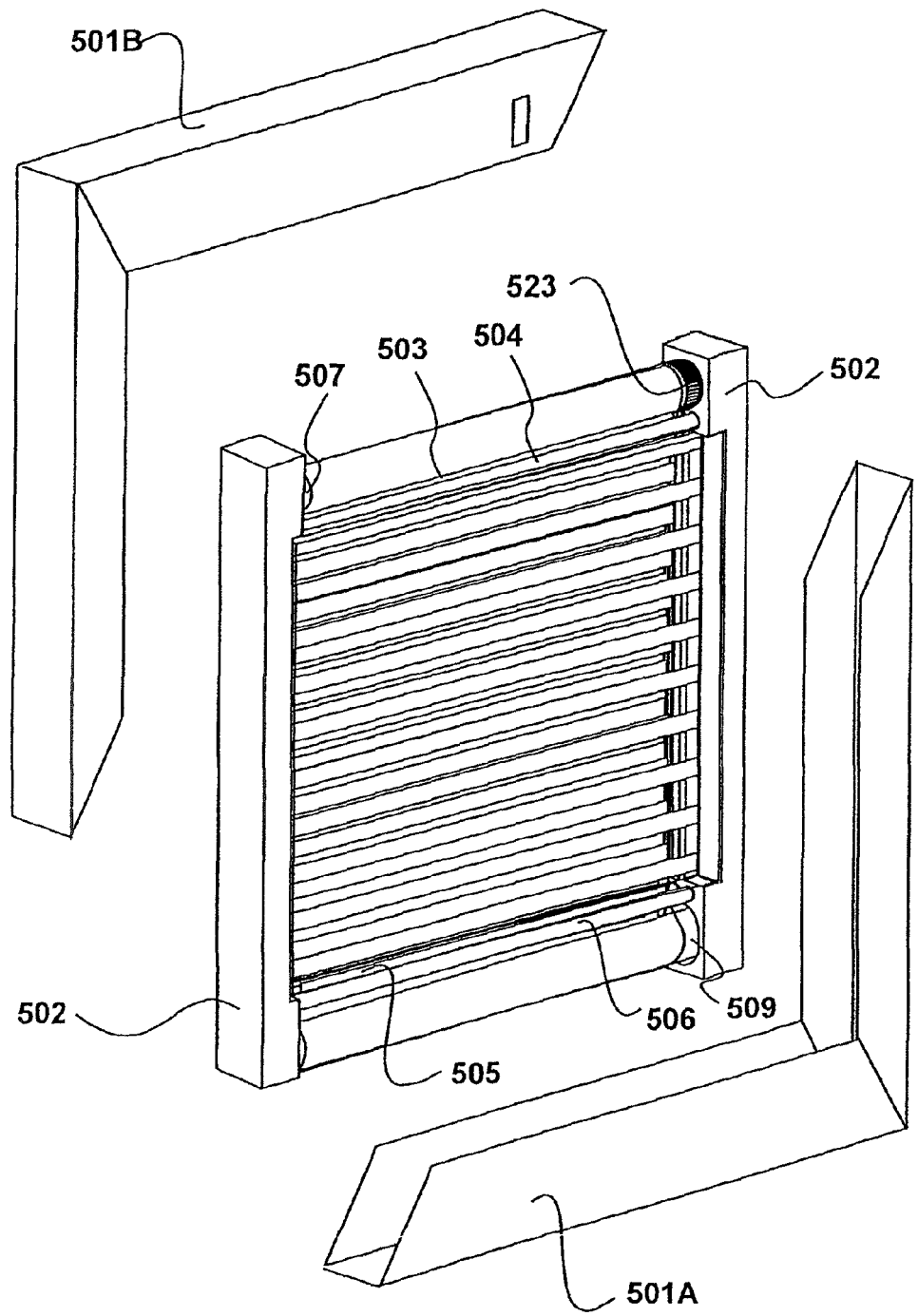
FIG. 6 shows the window unit 102 partly disassembled.

The window unit 102 is shown partly disassembled in FIG. 6 to further illustrate its construction. The outer frame 501 comprises two parts 501A and 501B. Each of these two parts comprises a u-shaped channel defining two of the straight sides of the rectangular frame 501. The first sheet 301, second sheet 313 (not visible in FIG. 6) the rollers 507 and 509 and the guide rods 503, 504, 505 and 506 extend between the two mounting blocks 502, thereby forming an inner subassembly 601.

FIG. 7

Figure 7:
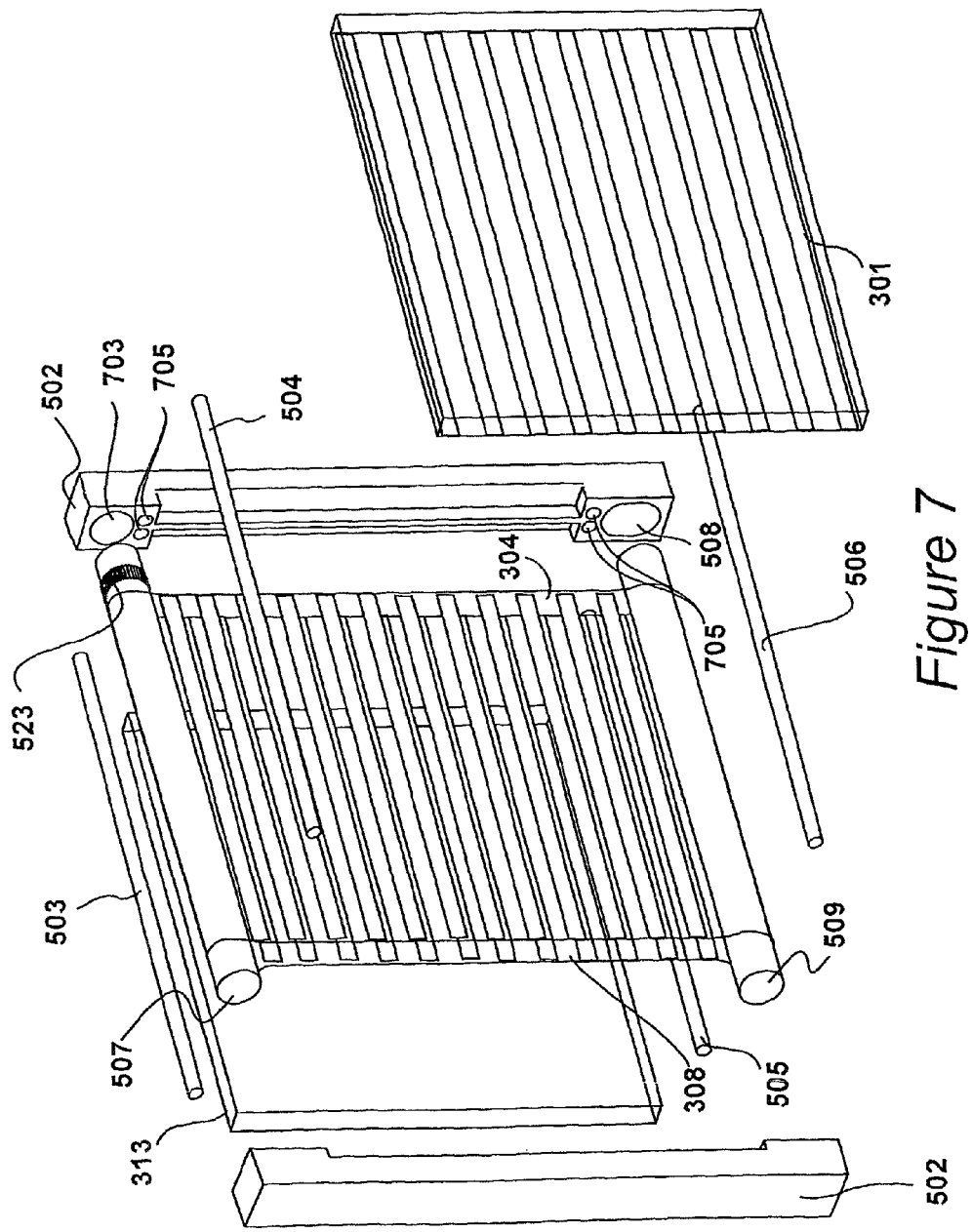
FIG. 7 shows the components forming the subassembly 601 partially separated.

The components forming the subassembly 601 are shown partially separated in FIG. 7. Thus, the first sheet 301, the second sheet 313, the guide rods 503, 504, 505 and 506, and the rollers 507 and 509 are shown removed from the mounting blocks 502.

The mounting blocks 502 are substantially identical in form. Thus each mounting block 502 defines a pair of recesses 701 dimensioned to receive a respective edge of the first sheet 301 and the second sheet 313. The recesses 701 are separated by a spacer element 702 that is dimensioned to fix the distance between the opposing faces of the first sheet 301 and second sheet 313.

The mounting blocks 502 also have an upper circular bore 703 configured to receive a respective end of the upper roller 507 and the elongated lower bore 508 configured to receive a respective end of the lower roller 509. Further circular holes 705 are provided to receive one end of each of the guide rods 503 to 506.

FIG. 8

Figure 8:
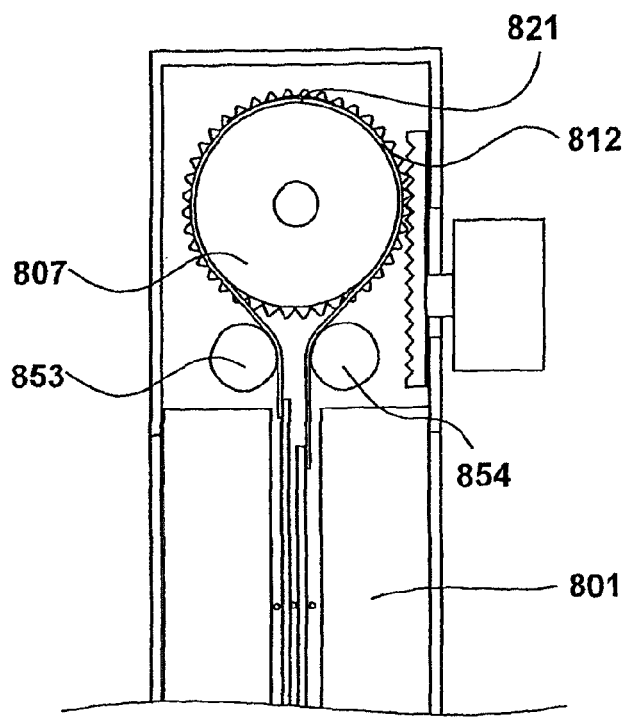
FIG. 8 shows a partial cross-sectional view of an alternative window unit 802.
Figure 8:
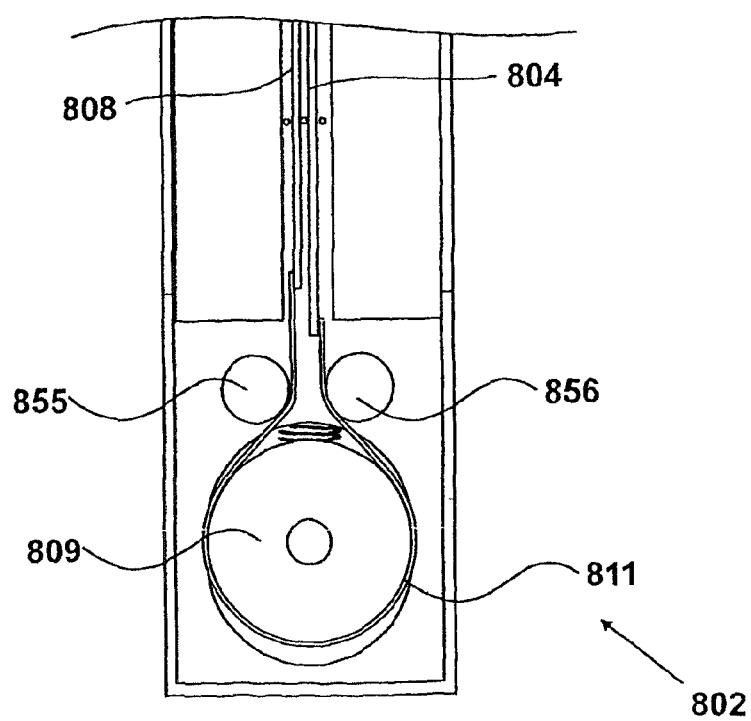

An alternative window unit 802 is shown in partial cross-section in FIG. 8. The window unit 802 is substantially identical to window unit 102, and so it has among other things a first sheet 801 defining high transmittance regions and low transmittance regions, and a second sheet portion 804 and third sheet portion 808, each of which also define high transmittance regions and low transmittance regions. However, the window unit 802 differs in its construction of the second sheet portion and third sheet portion. Specifically, the second sheet portion 804 and third sheet portion 808 are formed of a thicker and less flexible sheet material than the corresponding sheet portions (304 and 308) of window unit 102. In addition, whereas the sheet portions 304 and 308 of window unit 102 formed parts of a single sheet of material, the second. sheet portion 804 and third sheet portion 808 do not. Instead, the second sheet portion 804 and third sheet portion 808 each have a lower edge attached to a connection portion 811 formed of a thinner and more flexible sheet material. Similarly, the upper edges of the second sheet portion 804 and third sheet portion 808 are attached to opposing edges of an attachment portion 812, formed of a thinner and more flexible sheet material. The attachment portion 812 extends around the upper roller 807 and is fixed to the upper roller 807 by adhesive 821, in the form of double-sided adhesive tape.

This construction allows flexible sheet material to be used where flexing is required around the upper roller 807, lower roller 809 and guide rods 853, 854, 855 and 856, while ensuring that the sheet portions 804 and 808 displaying the high transmittance regions and low transmittance regions remain substantially flat and parallel to each other.

FIG. 9

An advantage of the above described window units is that the moving sheet portions are relatively light when compared to moving elements in the form of glass sheets as known in the prior art. Moreover, the prior art makes use of a single sheet which moves up and down, whereas the above described window units are arranged to have two sheet portions moving in opposite directions and thereby counterbalancing each other. i.e., the work required to raise one sheet portion is provided by the drop in height of the other sheet portion. Consequently, the energy required to move the window units from a closed configuration to an open configuration, or from an open configuration to a closed configuration is relatively small when compared to that required by prior art privacy windows. Consequently, much larger window units of a similar construction are envisaged.

Figure 9:
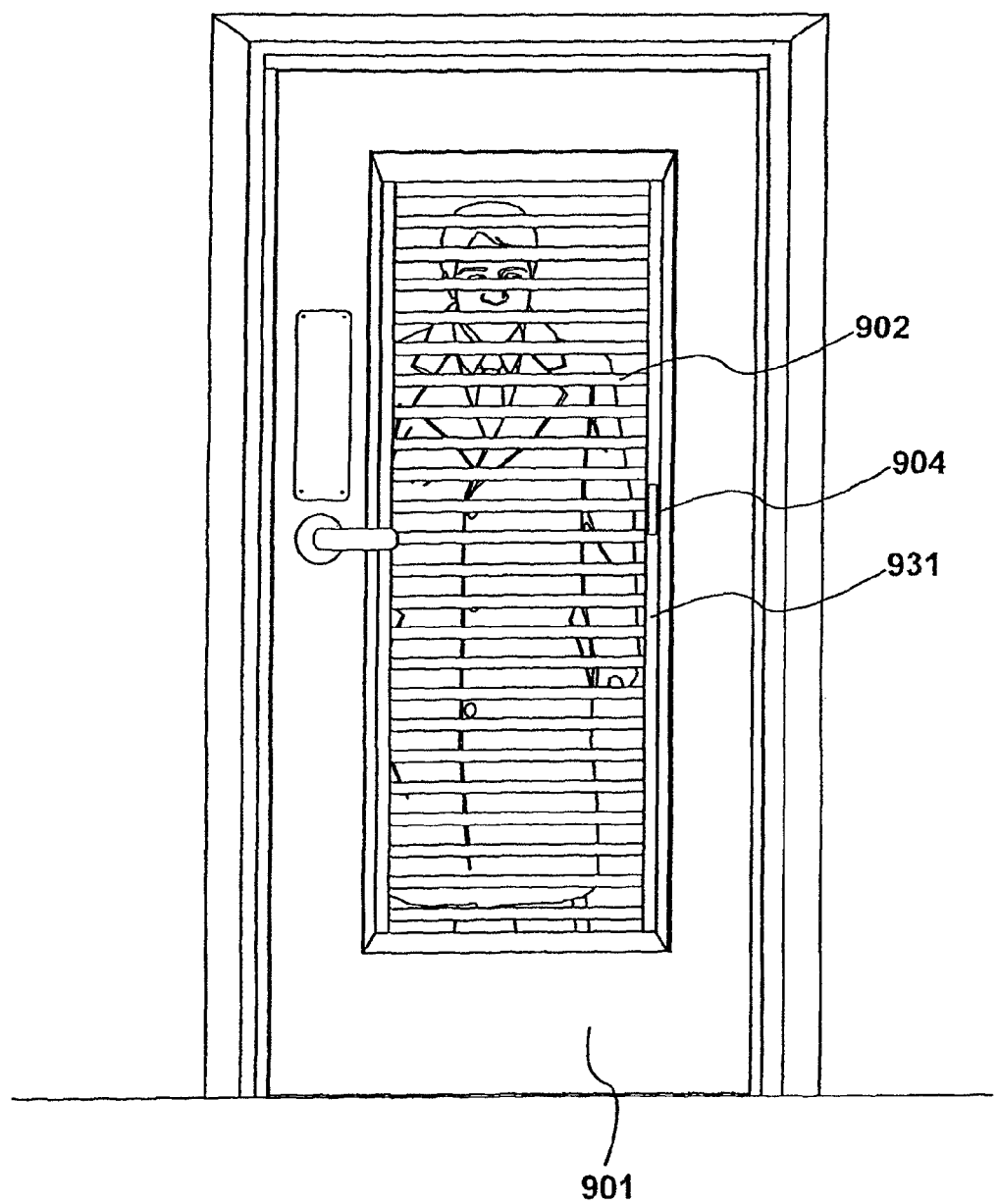
FIG. 9 shows a further window unit 902 embodying the present invention in a door 901.

A further window unit 902 embodying the present invention is shown in a door 901 in FIG. 9.

The window units 902 has a similar structure to the window units described above but firstly differs in that it is substantially wider and taller than the previously described window units, being 600 mm wide by 1600 mm tall. Secondly the window unit has a handle 904 mounted on a side element of the frame 931 of the unit, rather than one of the horizontal elements of the frame.

FIG. 10

Figure 10:
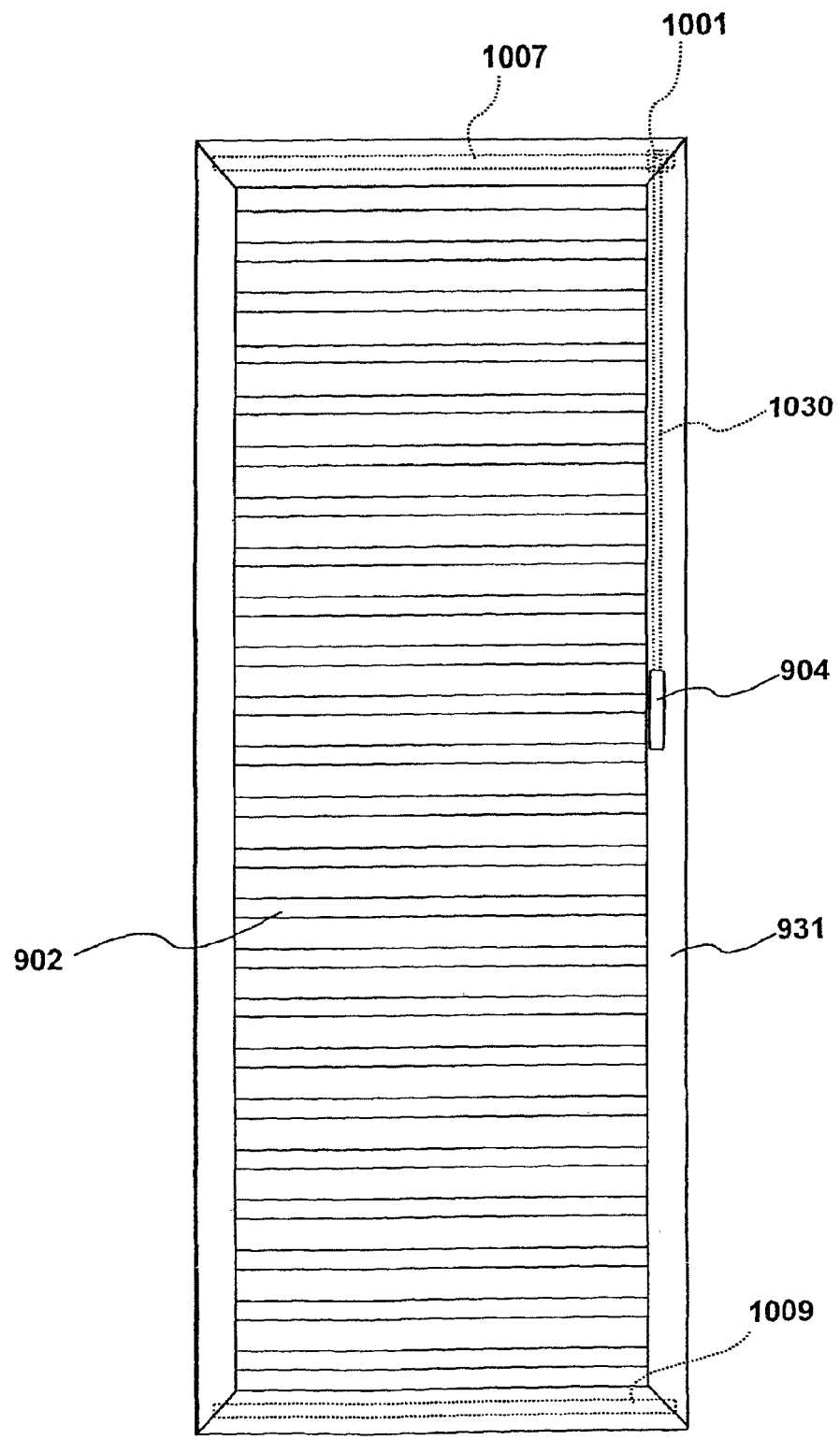
FIG. 10 shows an enlarged view of the window unit 902.

The window unit 902 is shown in an enlarged view in FIG. 10, separate from the door 901. Like the previously described window units, the window unit 902 has a second sheet portion and a third sheet portion arranged to be moved in opposite directions, by means of rollers 1007 and 1009, between an open configuration as shown in FIG. 10 to a closed configuration. The actuation means of window unit 902 for moving the sheet portions includes a rack and pinion mechanism 1001 similar to that of window unit 102 formed by the toothed rack 524 and toothed gear 523. However, to allow the actuating handle 904 to be positioned at a convenient height for users, the handle 904 is connected to the rack of the rack and pinion mechanism 1001 by an elongated push rod 1030. The push rod 1030 is arranged such that it is relatively broad and thin, i.e. having a laminate form, such that it may be mounted within the outer frame 931 of the window unit 902.

In alternative embodiments the push rod 1030 is replaced by a chain formed of a nylon cord to which beads are attached to form a chain, and this chain is arranged to drive a correspondingly formed gear that is mounted on the upper roller 1007 of the window unit 902.

FIG. 11

Figure 11:
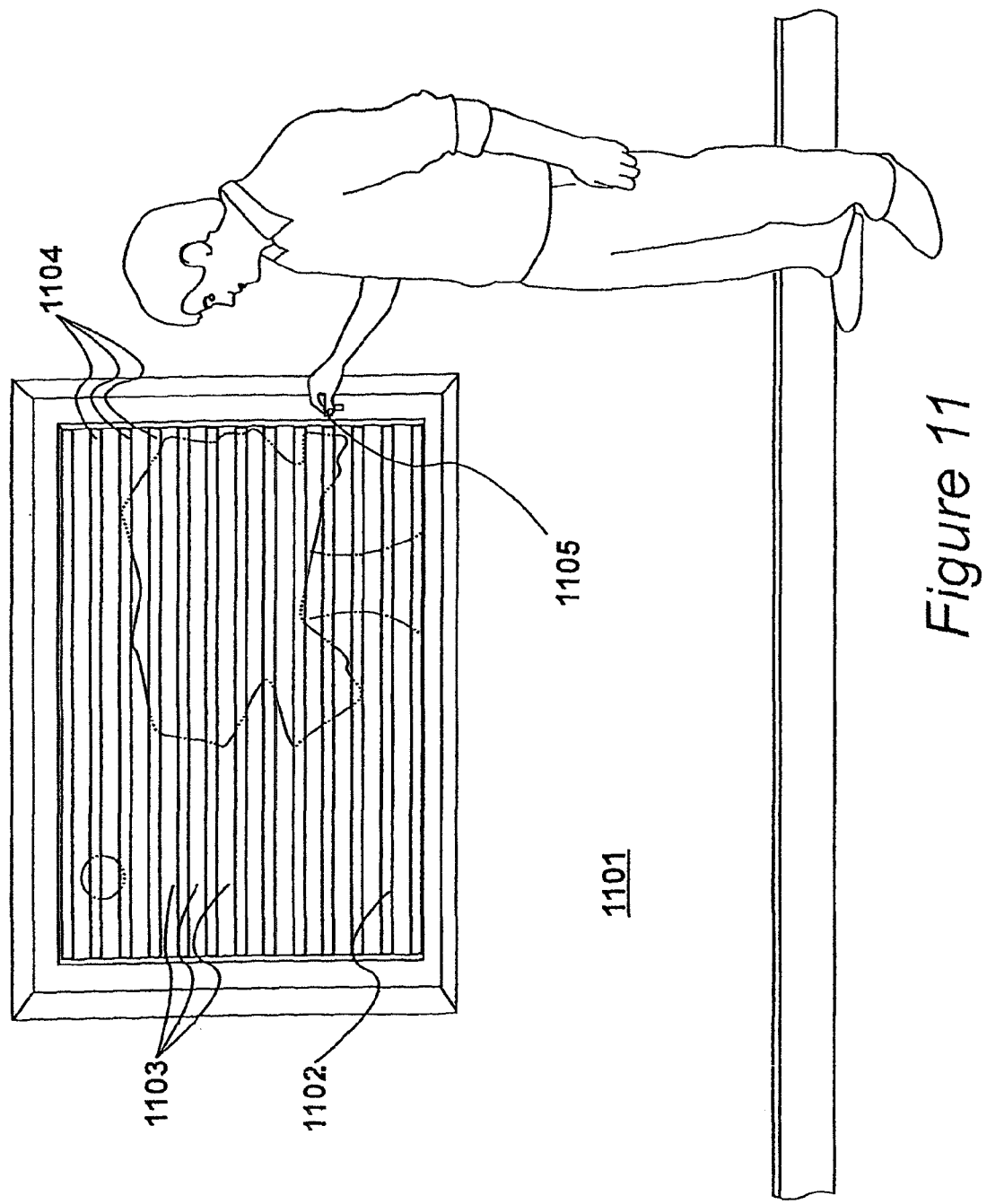
FIG. 11 shows an alternative window unit 1102 is shown in FIG. 11 mounted within an opening of a wall 1101.

An alternative window unit 1102 is shown in FIG. 11 mounted within a window recess of a wall 1101. The window unit 1102 has a similar structure to the above described window units and consequently it comprises a first sheet in the form of a sheet of toughened glass that has been processed to define high transmittance regions and low transmittance regions in the form of alternating horizontal stripes 1103 and 1104 respectively.

It also has second and third sheet portions arranged to be moved simultaneously by actuation means comprising a manually moveable handle 1005, a rack and pinion mechanism and rollers as described previously.

Each of the first sheet, the second sheet portion and the third sheet portion of the window unit 1102 has high transmittance regions that are transparent so that when they are aligned the window unit allows light to pass through the transparent portions 1104, relatively unhindered. However, the window unit 1102 differs from the previously described window units in that the first sheet, the second sheet portion and the third sheet portion have low transmittance regions (such as 1103) that are also partially transparent (that is, see-through) but filter out a proportion of the light that is incident upon them.

For the purposes of clarity, the expression "see-through", when used herein to describe regions of the first sheet, second sheet portion or third sheet portion, should be understood to mean that they are at least partially transparent, being sufficiently transparent such that at least some people are able to see objects illuminated by daylight through those regions and that they do not diffuse light so as to prevent viewing through those regions.

FIG. 12

Figure 12:
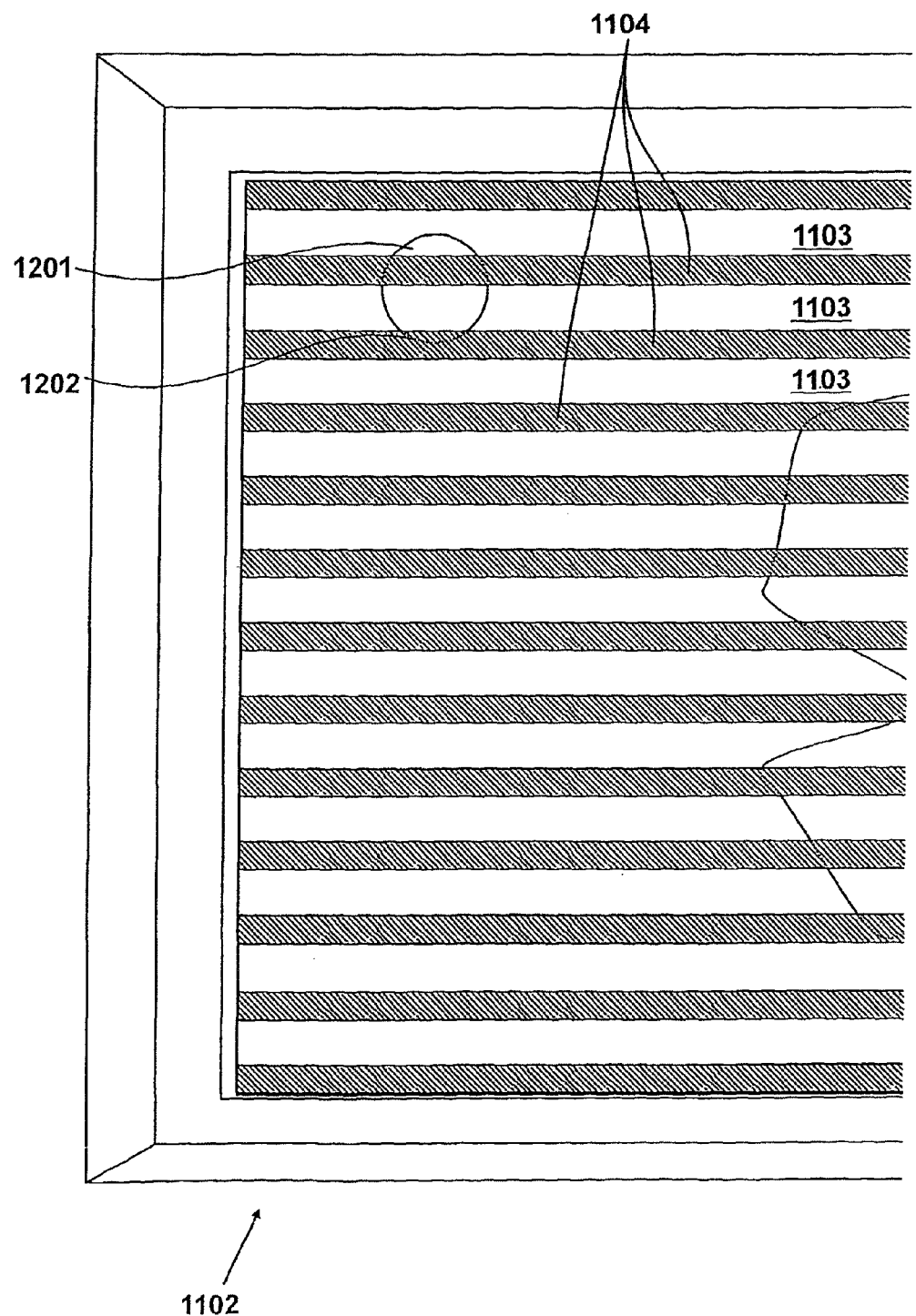
FIG. 12 shows a partial enlarged view of the window unit 1102 in its open configuration.

A partial enlarged view of the window unit 1102 is shown in FIG. 12 in its open configuration. As the window unit 1102 is in its open configuration, the high transmittance regions 1103 of the first sheet are aligned with the high transmittance regions of the second sheet portion and third sheet portion. Consequently, light, for example from the sun 1201, is able to pass through the high transmittance regions with very little filtering and reflection. In addition, the low transmittance regions 1104 of the first sheet are aligned with those of the second sheet portion and third sheet portion. However, because the low transmittance regions in the present embodiment are partially transparent, the sun 1201 may still be seen through these low transmittance regions, as indicated by the dotted lines 1202.

Figure 13:
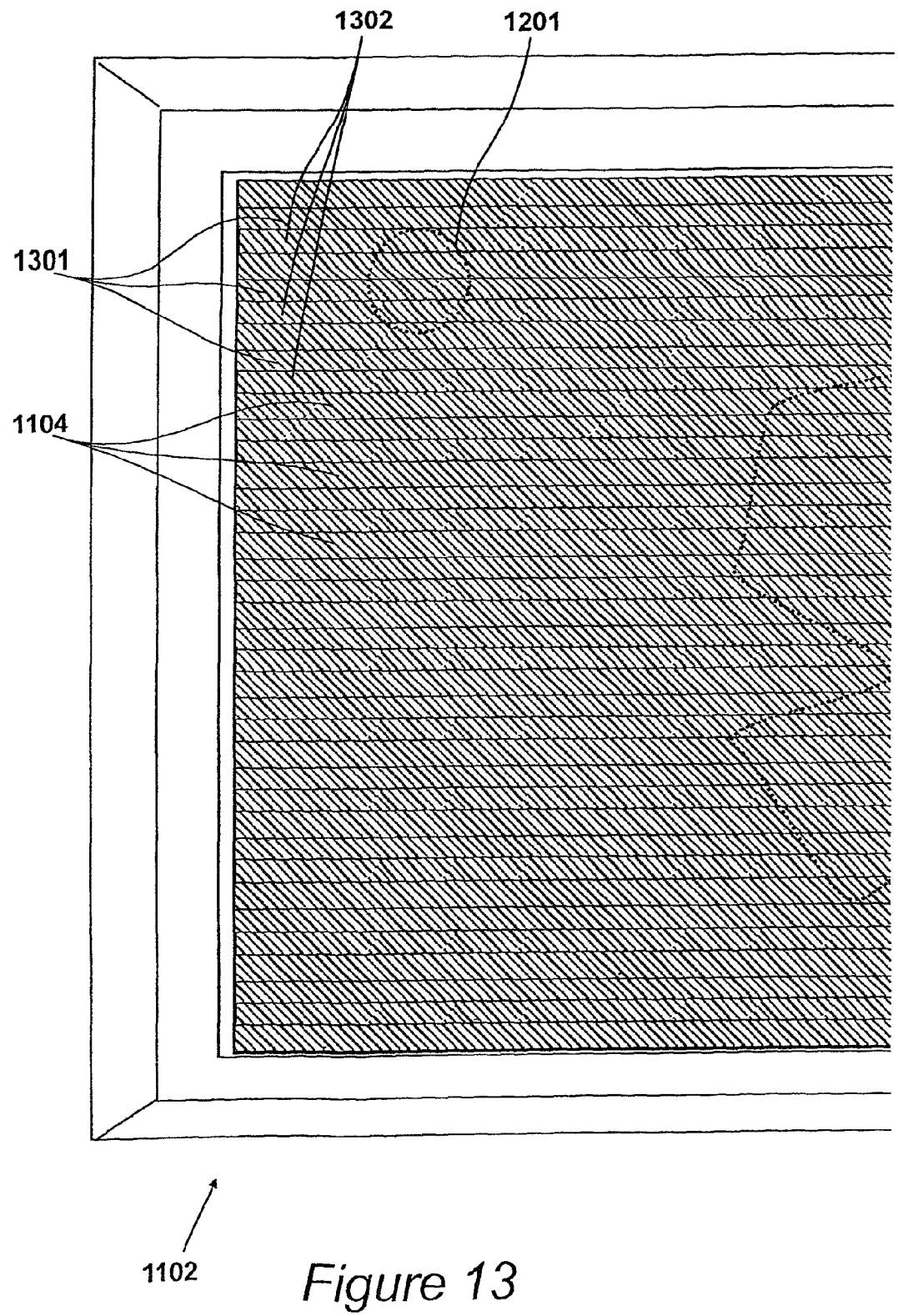
FIG. 13 shows a partial enlarged view of the window unit 1102, with the window unit in a fully closed configuration.
Figure 14:
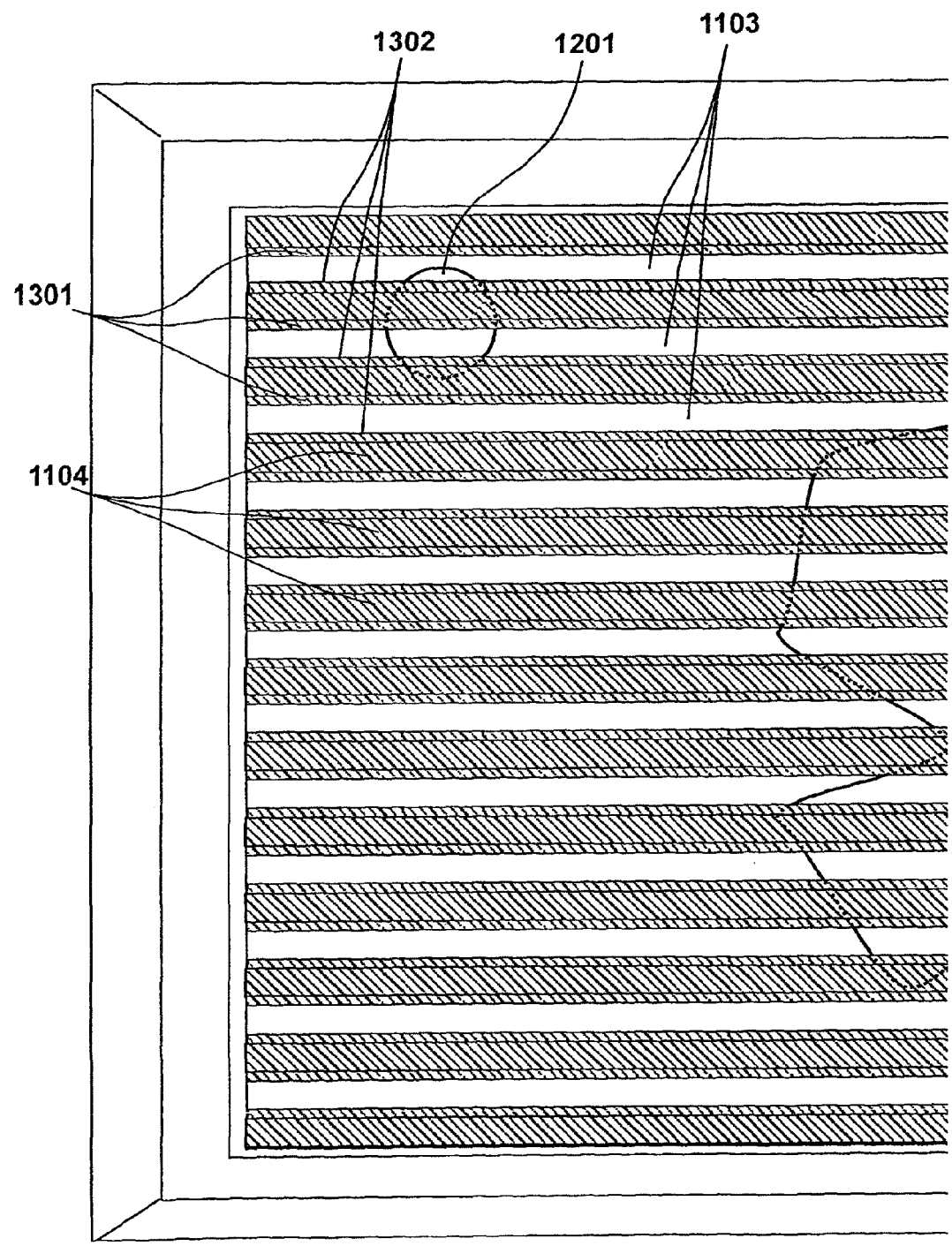
FIG. 14 shows a partial enlarged view of the window unit 1102, with the window unit in an intermediate closed configuration.

FIGS. 13 and 14

A partial enlarged view of the window unit 1102 is shown in FIG. 13 with the window unit in a closed configuration. Thus, the second sheet portion and the third sheet portion of window unit 1102 have been moved such that the low transmittance regions 1301 of the second sheet portion and the low transmittance regions 1302 of the third sheet portion cover the high transmittance portions of the first sheet. Thus, the low transmittance portions 1301 of the second sheet portion, the low transmittance portions 1302 of the third sheet portion and the low transmittance portions 1104 of the first sheet act to reduce the light transmitted through the window unit 1102 across its whole area. However, as each of the low transmittance regions has only a filtering effect but is partially transparent, it is still possible to see through the window unit 1102, so that objects, such as the sun 1201, may be seen.

As the window unit 1102 in the closed configuration only allows filtered light to pass through, it acts as a shade to reduce the amount of daylight passing through.

The low transmittance regions may also be arranged to absorb or reflect radiant heat as well as light if required. The low transmittance regions may be provided by applying partially transparent coatings to the first sheet, second sheet portion and third sheet portion. This may be achieved by known techniques, such as by printing using a coloured transparent ink, or by using an opaque ink printed in pattern, for example an array of microscopic dots. Alternatively, the low transmittance regions may be provided by applying strips of a separate material to each of the first sheet, second sheet portion and third sheet portion. For example the low transmittance regions could be provided by applying strips of metallized foil, or a coloured transparent polymeric foil, to each of the three layers.

In the present embodiment, the window unit does not necessarily provide privacy, as was the case for the previously described embodiments, but instead it provides a shade for filtering light as required. Consequently, as well as moving the window unit 1102 between the open configuration of FIGS. 11 and 12 and the closed configuration of FIG. 13, a user may wish to move the window unit 1102 into an intermediate closed position in which intermediate shading is provided. Thus, as shown in FIG. 14, the window unit 1102 may be adjusted such that the low transmittance regions 1301 of the second sheet portion and the low transmittance regions 1302 of the third sheet portion are not aligned with the low transmittance portions 1104 of the first sheet, but also they are not completely obscuring the high transmittance regions 1103 of the first sheet.

FIG. 15

Figure 15:
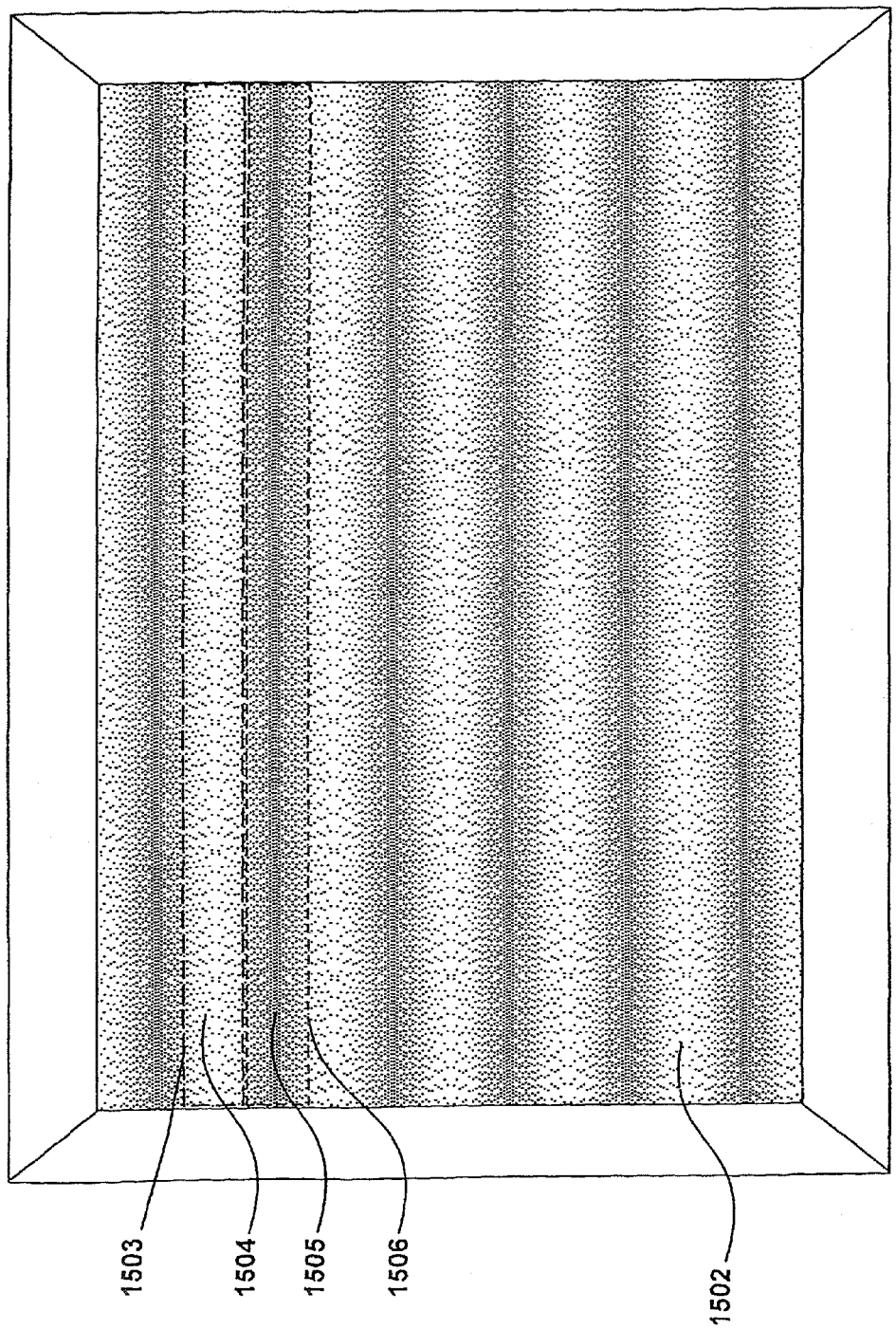
FIG. 15 shows a further window unit 1502 embodying the present invention.

A further window unit 1502 embodying the present invention is shown in FIG. 15. Like the window unit 1102, the window unit 1502 has a first sheet, a second sheet portion and a third sheet portion which each define bands of low transmittance that are not opaque and are effectively transparent in that it is possible to see objects through the low transmittance regions (i.e. they are see-through). Like the previous embodiment, the low transmittance regions and the high transmittance regions are arranged in horizontal bands, but unlike the previous embodiments the light transmittance of each band is not uniform across the width of the band.

In the present example, each of the low transmittance bands has a minimum transmittance along a centre line with increasing light transmittance above and below that line.

Similarly, the high transmittance regions do not have a uniform light transmittance across their width, instead they have a maximum transmittance along a central line with decreasing transmittance above and below that line.

Furthermore, as illustrated in FIG. 15, the pattern of high transmittance regions and low transmittance regions is such that there is no clear boundary between the low transmittance regions and high transmittance regions. However, it is possible to define an arbitrary boundary for each region such that the average transmittance of light in a low transmittance region is lower than the average transmittance in a high transmittance region. For example, the dashed line 1503 surrounds a high transmittance region 1504 having a higher transmittance of light than an adjacent low transmittance region 1505 bounded by dashed line 1506.

FIG. 16

Figure 16:
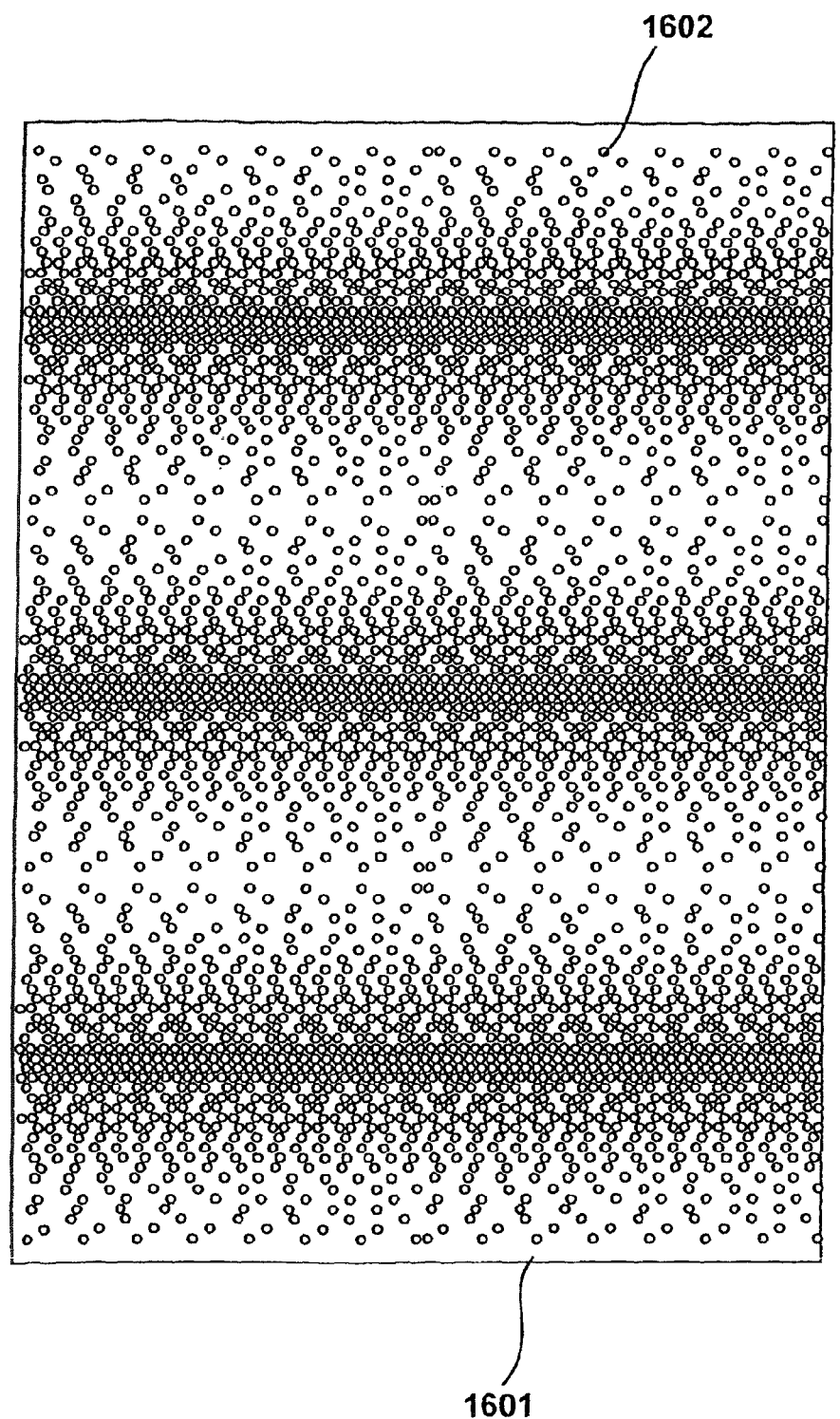
FIG. 16 shows a portion of the first sheet 1601 of the window unit 1502.

A portion of the first sheet 1601 of the window unit 1502 is shown in FIG. 16. As illustrated in FIG. 16, the first sheet 1601 has been printed with a pattern comprising dots such as dot 1602. The dots, such as dot 1602, comprise of an ink configured to absorb or reflect at least a portion of light that is incident upon them. Consequently, in regions where there are more dots per unit area, the first sheet 1601 has a relatively low transmittance, whereas in regions where the dots are spaced further apart the first sheet has a relatively high transmittance.

FIGS. 17, 18 & 19

In the present embodiment, the second sheet portion and the third sheet portion of window unit 1502 are provided with a similar pattern of dots to that of the first sheet 1601. To illustrate the effect of such patterns when overlapping, the portion of the first sheet 1601 previously shown in FIG. 16 is shown along with similar such portions of the second sheet portion 1701 and third sheet portion 1702 in FIGS. 17, 18 and 19.

Figure 17:
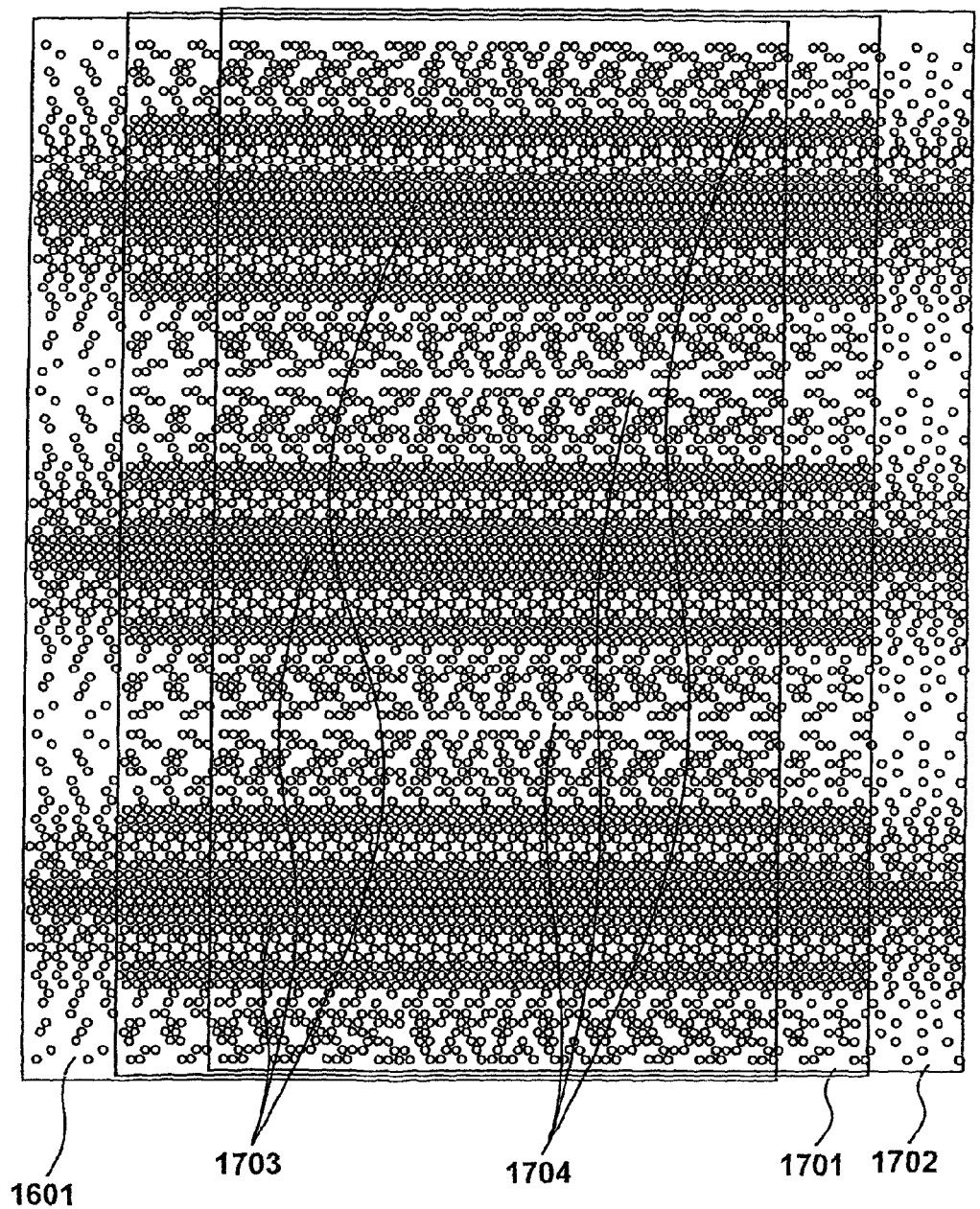
FIG. 17 shows the first sheet 1601, previously shown in FIG. 16, along with similar such portions of the second sheet portion 1701 and third sheet portion 1702, when the window unit is in its open configuration.

In FIG. 17 the portions of the first sheet 1601, the second sheet portion 1701 and the third sheet portion 1702 are shown with their low transmittance regions aligned. Consequently, where the three layers (1601, 1701 and 1702) overlap there are identifiable regions 1703 that have lower transmittance compared to other regions 1704 having higher transmittance.

Figure 18:
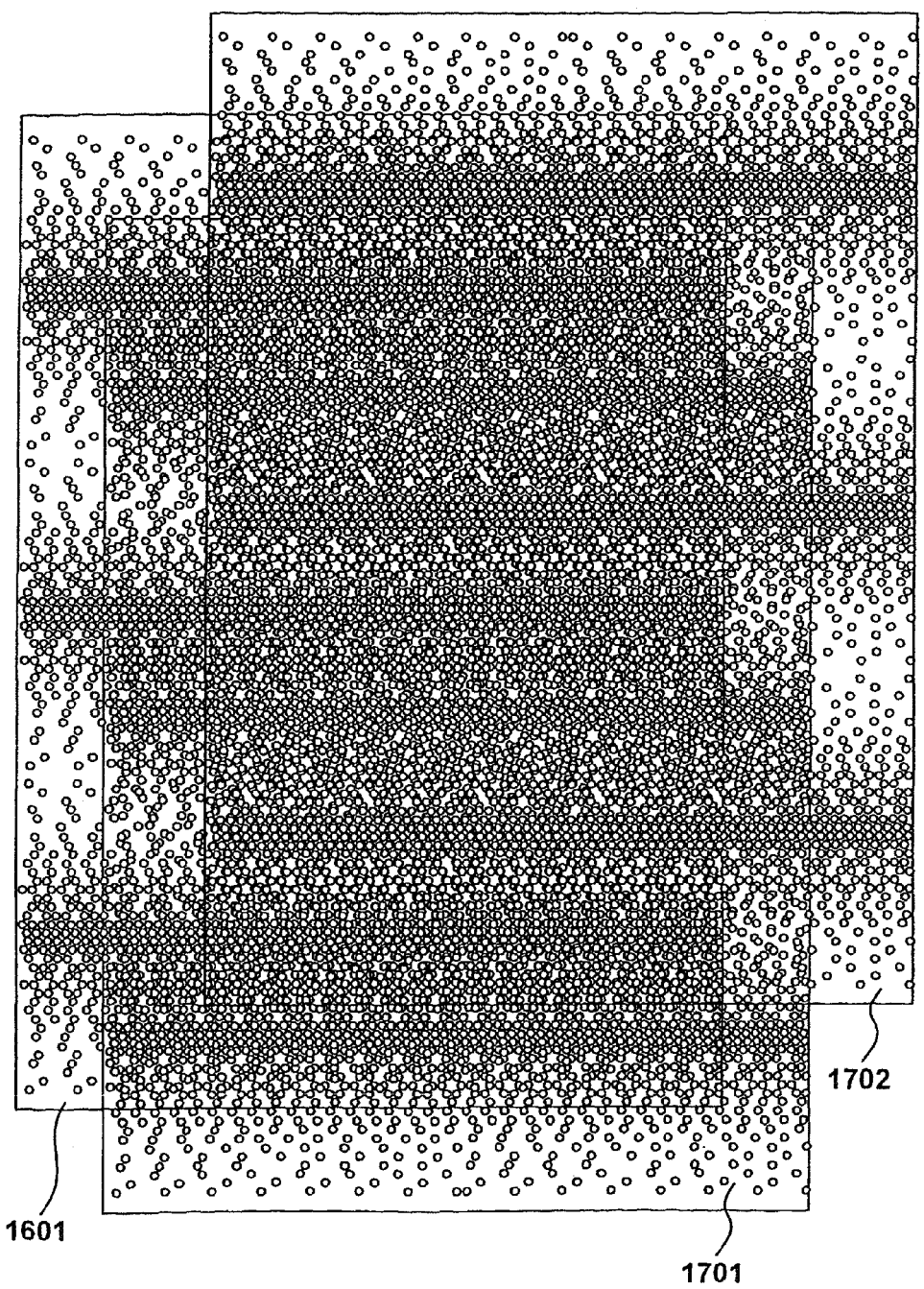
FIG. 18 shows the first sheet 1601 along with the second sheet portion 1701 and third sheet portion 1702, when the window unit is in its fully closed configuration.

The portions of the first sheet 1601, the second sheet portion 1701 and the third sheet portion 1702 are shown again in FIG. 18 with the second and third sheet portions 1701 and 1702 moved into their closed positions. As a consequence, the low transmittance regions of the second sheet portion 1701 and third sheet portion 1702 overlay the high transmittance regions of the first sheet 1601. Consequently, the transmittance of the window unit is generally reduced and the banded pattern seen in FIG. 17 is very much reduced.

Figure 19:
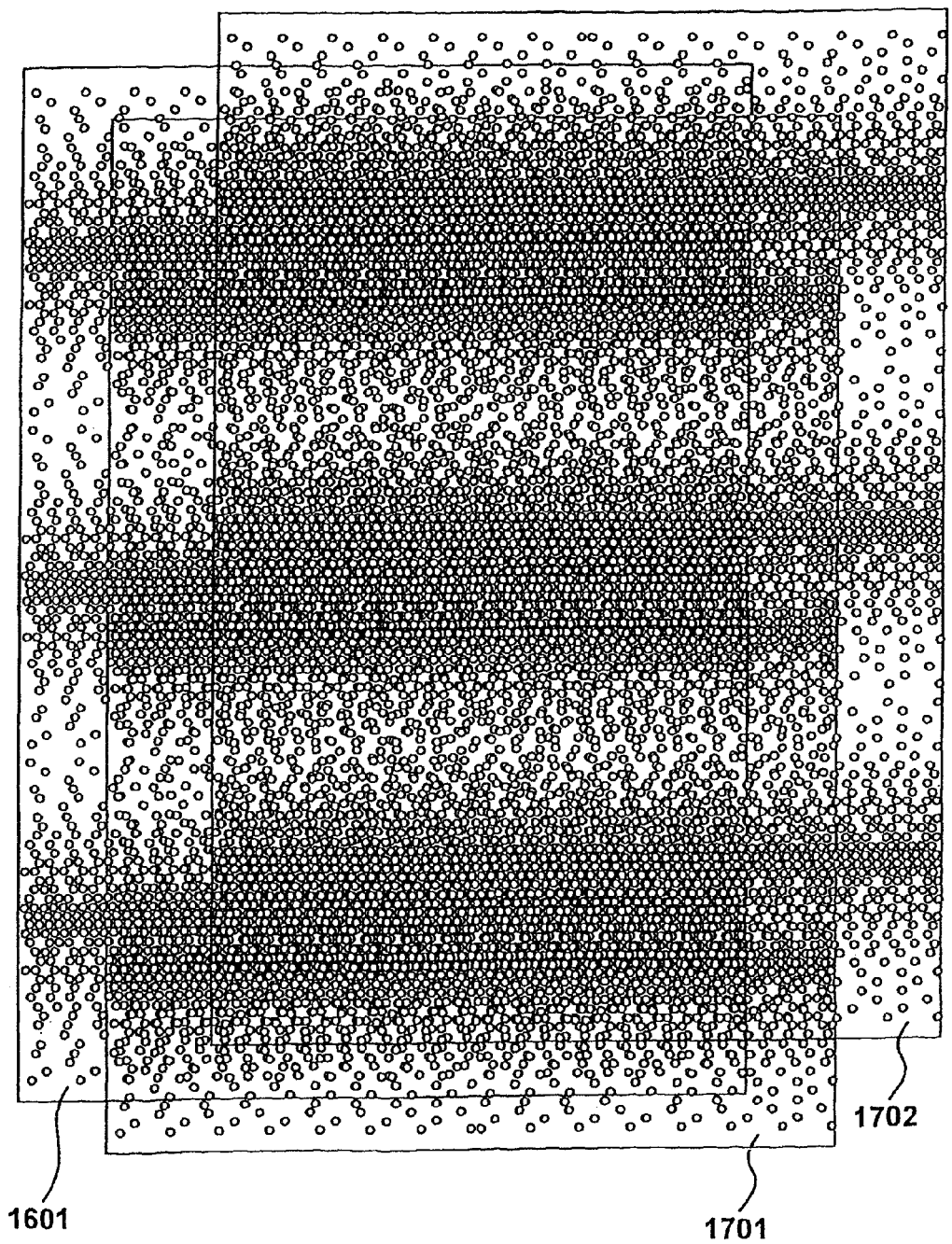
FIG. 19 shows the first sheet 1601 along with the second sheet portion 1701 and third sheet portion 1702, when the window unit is in its intermediate closed configuration

The second sheet portion 1701 and the third sheet portion 1702 are shown in FIG. 19 moved with respect to first sheet 1601 into an intermediate closed position. In this intermediate position, the bands of low transmittance and high transmittance that were apparent in FIG. 17 have become less well defined and the transmittance of the window unit as a whole is intermediate between that of the open configuration of FIG. 17 and that of the closed configuration of FIG. 18.

FIG. 20

Figure 20:
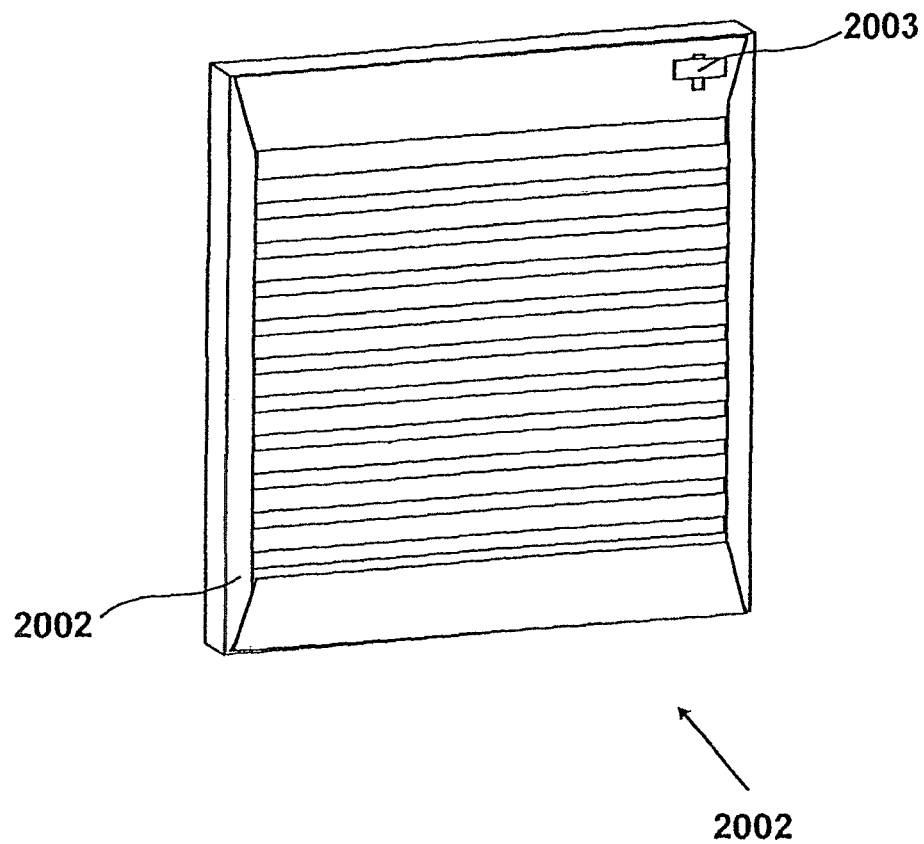
FIG. 20 shows a further window unit 2001 embodying the present invention.

A further window unit 2001 embodying the present invention is shown in FIG. 20. Like the previous embodiments, the window unit 2001 comprises an outer frame 2002 within which are located a first sheet, a second sheet portion and a third sheet portion in accordance with the present invention. The window unit 2001 also includes a lever 2003 forming part of the actuation means for simultaneously moving the second sheet portion and the third sheet portion from an open configuration to a closed configuration, or from the closed configuration to the open configuration.

FIG. 21

Figure 21:
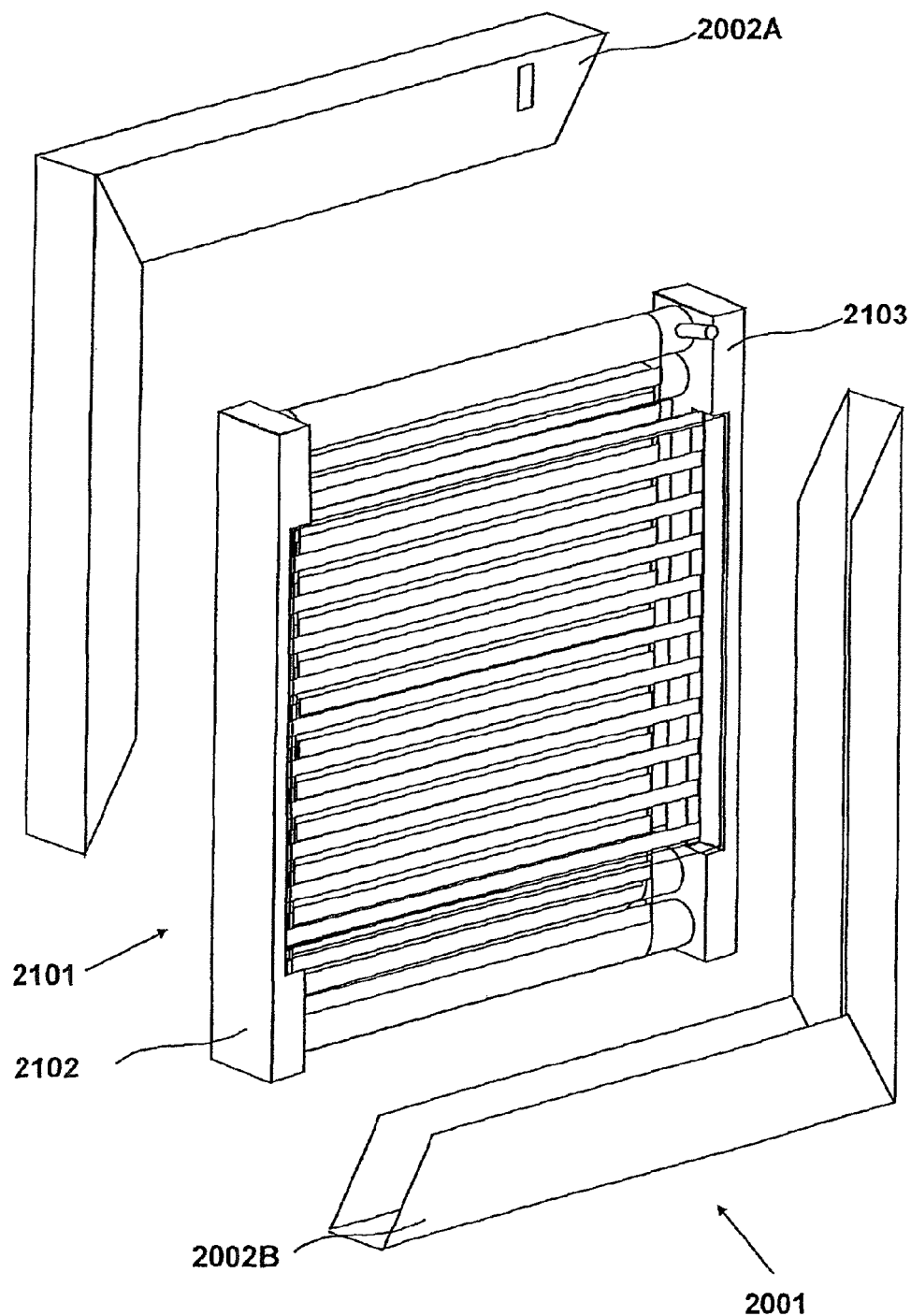
FIG. 21 shows the window unit 2001 with the parts 2002A and 2002B of the frame 2002 removed to expose an inner subassembly 2101.

The frame 2002 is formed of two parts, 2002A and 2002B, and the window unit 2001 is shown again in FIG. 21 with the parts of the frame 2002 removed to expose an inner subassembly 2101 of the window unit 2001. The subassembly 2101 includes a pair of mounting blocks 2102 and 2103 that define recesses and holes for receiving and supporting parts of other components of the subassembly 2101.

FIG. 22

Figure 22:
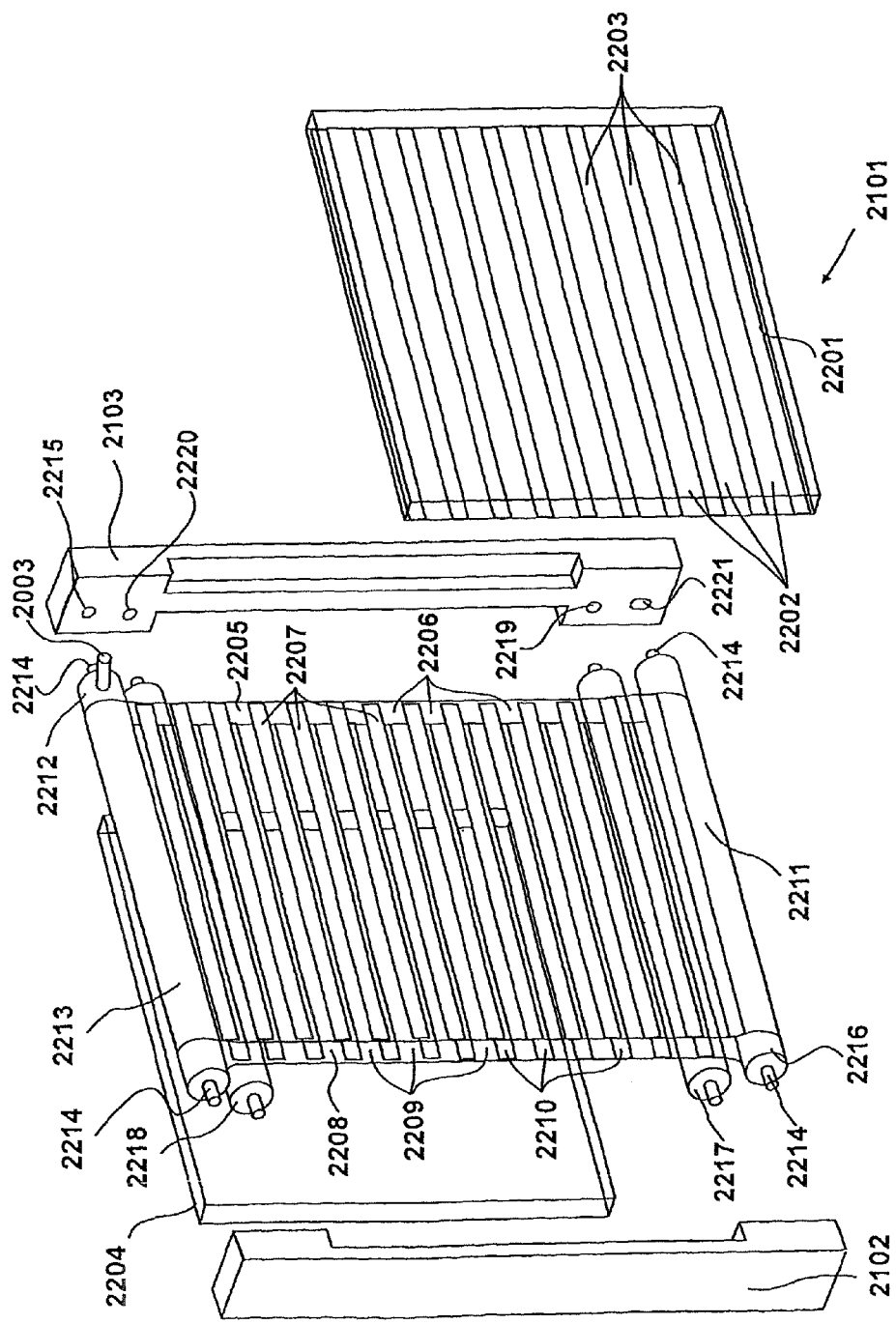
FIG. 22 shows the subassembly 2101 of FIG. 21 partially disassembled.

The subassembly 2101 shown in FIG. 21 is shown again in FIG. 22 partially disassembled. As mentioned above, the subassembly 2101 includes a pair of mounting blocks 2102 and 2103 and it also comprises a first sheet 2201 defining first high transmittance regions 2202 and first low transmittance regions 2203. In the present embodiment, the first sheet 2201 is formed of a sheet of glass onto which are painted opaque stripes 2203 to form the first low transmittance regions separated by the first high transmittance regions 2202. Thus as shown in FIG. 22, the low transmittance regions 2203 and high transmittance regions 2202 form alternating horizontal stripes.

The subassembly 2101 also comprises a fourth sheet 2204 that is completely transparent, being formed of a piece of plain sheet glass of similar dimensions to the first sheet 2201.

The subassembly 2101 also comprises a second sheet portion 2205 defining second high transmittance regions 2206 and second low transmittance regions 2207. The second low transmittance regions 2207 are formed in a similar manner to the first low transmittance regions 2203 of the first sheet 2201, and therefore the second low transmittance regions 2207 take the form of opaque horizontal stripes separated by substantially transparent stripes providing the high transmittance regions 2206.

The subassembly 2101 also comprises a third sheet portion 2208 that defines third high transmittance regions 2209 and third low transmittance regions 2210. The low transmittance regions 2210 also have a similar form to the low transmittance regions 2203 and so they define a series of parallel horizontal opaque stripes separated by transparent stripes forming the high transmittance regions 2209.

Lower ends of the second sheet portion 2205 and third sheet portion 2208 are connected together by a connection portion 2211. In the present embodiment, the second sheet portion 2205, the third sheet portion 2208 and the connection portion 2211 are formed of a single length of flexible sheet material made from a transparent polyester sheet material.

Upper ends of the second sheet portion 2205 and third sheet portion 2208 are attached to a rotatable drive element 2212 by attachment portions 2213. In the present embodiment, the attachment portions are formed of the same sheet of material as the second sheet portion 2205 and third sheet portion 2208.

In the present embodiment, the attachment portions 2213 are attached to the rotatable drive element 2212 by adhesive tapes, in a similar manner to that described above for the window unit 102. However, in alternative embodiments, the attachment portions 2213 are attached to one another but not to the rotatable drive element 2212. In these embodiments, the rotatable element is provided with a high friction surface (such as a rubber surface) capable of driving the sheet portions 2205 and 2208 by friction, or alternatively the rotatable drive element has protruding elements that engage suitably shaped apertures formed in the attachment portions 2213.

The rotatable drive element 2212 takes the form of a cylindrical roller having a coaxial axle extending from each of its ends. The axles 2214 have a diameter dimensioned to locate within a respective hole 2215 formed in the mounting blocks 2102 and 2103.

The subassembly 2101 comprises three further rollers 2216, 2217 and 2218, which have a similar form to the rotatable drive member 2212. Thus, the rollers 2216, 2217 and 2218 each have a cylindrical outer surface and a coaxial axle extending from each end and configured to locate within a respective hole formed within the mounting blocks 2102 and 2103. The second upper roller 3218 and the second lower roller 2217 are each mounted within circular holes 2219 and 2220 formed in the mounting blocks 2102 and 2103, while the axles 2214 of the first lower roller 2216 are located within slots 2221.

As shown in FIG. 22, the attachment portions 2213 of the second sheet portion 2205 and third sheet portion 2208 extend around the outer cylindrical surface of the rotatable drive element 2212, while the connection portion 2211 extends around the first lower roller 2216. When assembled, the other two rollers 2217 and 2218 are positioned against the outside of the third sheet portion 2208 as will be described in further detail below.

In the present embodiment, the lever 2003 is attached to the rotatable drive element 2212 to allow a person to move the lever and thereby turn the drive element 2212 and move the second and third sheet portions 2205, 2208. However, alternative embodiments are envisaged in which the actuation means for moving the second and third sheet portions comprises one of the many different forms described above with reference to the first embodiment. One such alternative actuation means comprises an electric motor mounted within the outer frame 2002 and arranged to drive the rotatable drive element 2212. In one embodiment using an electric motor, the motor is arranged to operate in forward and reverse directions to move the second and third sheet portions up and down as required. However, in one embodiment employing an electric motor, the second and third sheet portions comprise a continuous loop of material that is not fixed to the rotatable drive element but instead they are driven by friction (or similar means) as described above. This arrangement allows the electric motor to operate in just one direction. I.e. if the motor were continuously operated, the sheet portions would be continuously moved alternately through their open and closed positions.

Further alternative embodiments are envisaged in which the second and third sheet portions comprise a continuous loop of material that is not fixed to the rotatable drive element but instead they are driven by friction, or mechanical interaction, between the rotatable drive element and the continuous loop of material. In these embodiments, the second and third sheet portions are provided with low transmittance regions having different appearances. For example, a first set of these low transmittance regions are provided with a first pattern and/or colour while a second set are provided with a second pattern and/or colour, while further possible sets are provided with other different patterns and/or colours. In some such embodiments, the first sheet is similarly provided with low transmittance regions having different appearances. Consequently, when the window unit is placed in a closed configuration, it presents an appearance that depends upon the relative positions of the second sheet portion, the third sheet portion and the first sheet.

In one example, the first sheet has four types of low transmittance portions labelled 1a, 1b, 1c, 1d, and the second sheet portion and third sheet portions have three types of low transmittance portions labelled 2p, 2q, 2r, (for the second sheet portion) and 2p', 2q', 2r' (for the third sheet portion). The low transmittance portions may be arranged in the order 1a, 2p, 2p', 1b, 2q, 2r', 1c, 2r, 2q', 1d, 2p, 2p', 1a, 2q, 2r', 1b, 2r, 2q', 1c, 2p, 2p', 1d, 2q, 2r', or, by moving the second sheet portion down and the third sheet portion up to the next closed configuration, they may be arranged in the order 1a, 2r, 2r', 1b, 2p, 2q', 1c, 2q, 2p', 1d, 2r, 2r', 1a, 2p, 2q', 1b, 2q, 2p', 1c, 2r, 2r', 1d, 2p, 2q' to provide the window unit with a different appearance. Of course, moving the sheet portions to other closed configurations provides the window unit with still further different appearances.

FIGS. 23 & 24

Figure 23:
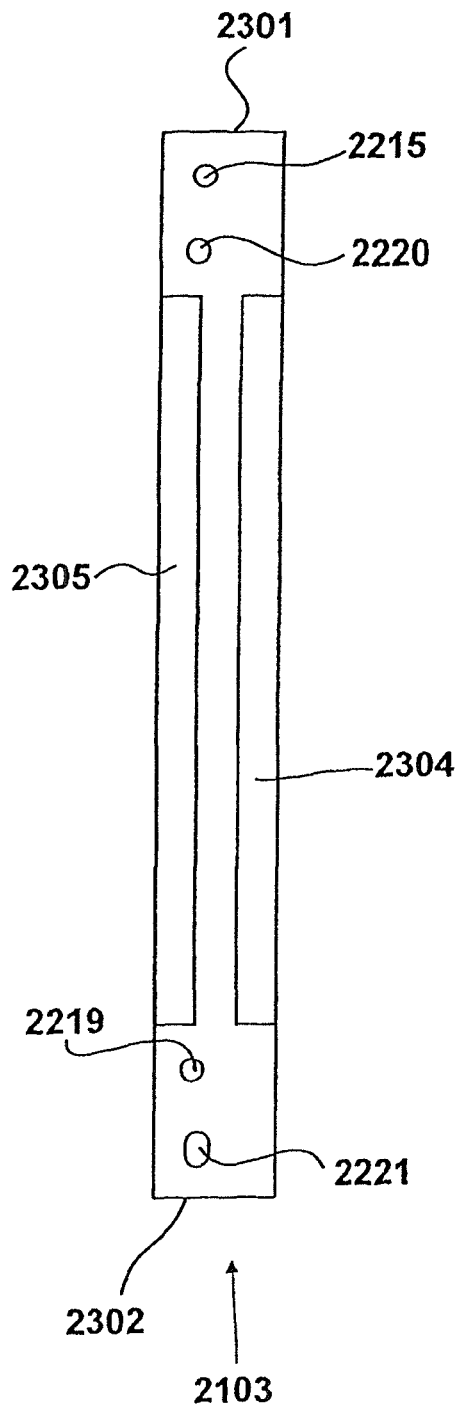
FIGS. 23 and 24 show the mounting block 2103 in a front view and a side view respectively.
Figure 24:
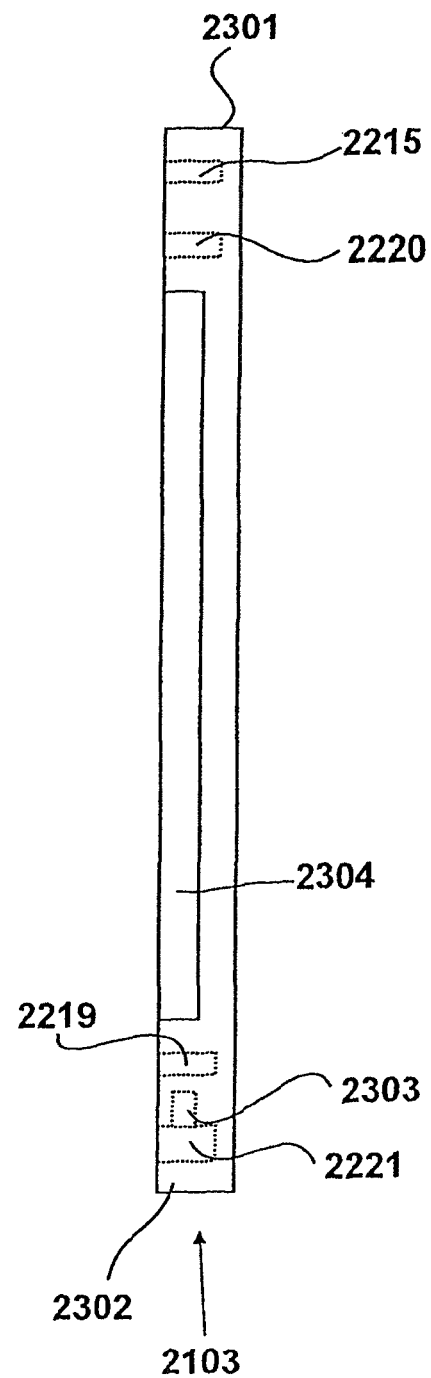

The mounting block 2103 is shown in a front view in FIG. 23 and in a side view in FIG. 24. It should be understood that the mounting block 2102 has a shape that is the mirror image of mounting block 2103, and consequently it shares the same features as mounting block 2103.

As mentioned above, the mounting block has a first hole 2215 and second hole 2220 towards its upper end 2301 for receiving the axles of the upper rollers 2212 and 2218.

Towards its lower end 2302 the mounting block 2103 has the third hole 2219 for receiving the axle of the lower roller 2217, and the slot 2221 for receiving the axle of the other lower roller 2216. In addition, the mounting block 2103 defines a cavity 2303 extending upwards from the slot 2221 for receiving a spring device, as will be described below.

Between the upper holes 2215, 2220 and the lower holes 2219, 2221, the mounting block defines a pair of rectangular shaped recesses 2304 and 2305 dimensioned to receive an edge of the first sheet 2201 and the fourth sheet 2204 respectively. When the first and fourth sheet are located in the recesses of both mounting blocks 2102 and 2103 the sheets 2201 and 2204 are positioned parallel to each other.

FIGS. 25 & 26

Figure 25:
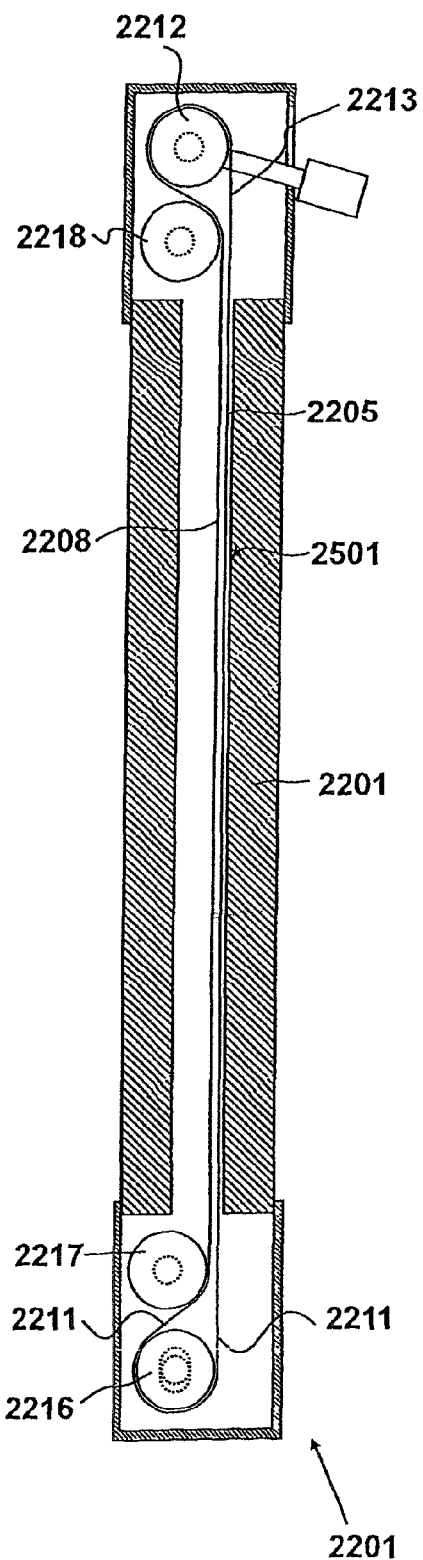
FIG. 25 shows a cross-sectional view of the window unit 2001.
Figure 26:
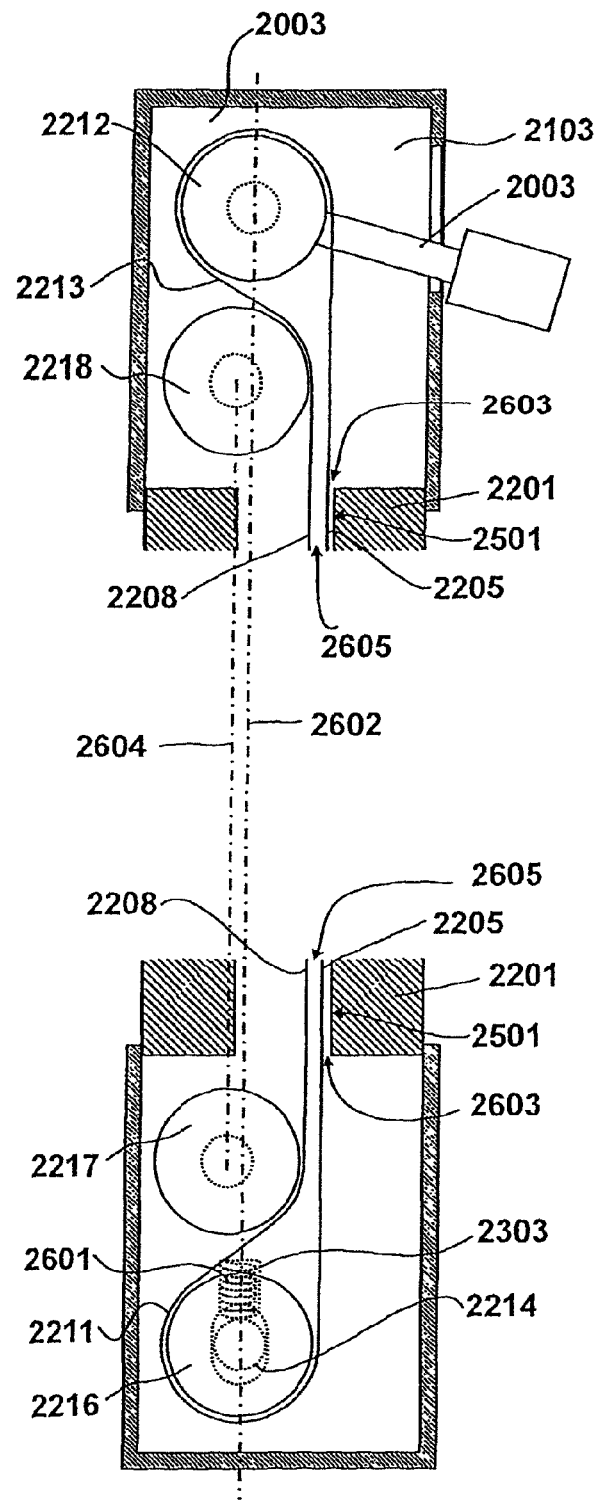
FIG. 26 shows enlarged views of the upper and lower ends of the cross-sectional view of FIG. 25.

The window unit 2001 is shown in the cross-sectional view of FIG. 25, while the upper and lower ends of the cross-sectional view of FIG. 25 are shown enlarged in FIG. 26.

As shown in FIG. 25, the second sheet portion 2205 and the third sheet portion 2208 are positioned substantially parallel to each other and to the inner face 2501 of the first sheet 2201. The connection portion 2211 extends around the lowermost roller, or guide member, 2216, and the attachment portions 2213 at the upper end of the sheet portions 2205, 2208 extend around the uppermost roller (the rotatable drive element 2212). Thus, the lowermost roller 2216 and uppermost roller 2212 are located within the loop formed by the sheet portions 2205, 2208, connection portion 2211 and attachment portions 2213. The other two rollers 2217 and 2218 are located outside of this loop, and are arranged to rest against the outer surface of the third sheet portion 2208.

As illustrated in FIG. 26, a spring means, in the form of a helical spring 2601 is located within the cavity 2303 and is configured to be compressed during use such that it applies a force to the axle 2214 of the lowermost roller, or guide member, 2216. The spring 2601 acts to push the lowermost roller 2216 downwards so that it applies a force to the connection portion 2211 to keep the second sheet portion 2205 and third sheet portion 2208 in tension. This ensures that these sheet portions 2205 and 2208 are kept substantially flat and parallel alongside the first sheet portion 2201.

In order to make the second sheet portion 2205 parallel to the first sheet 2201, the uppermost roller 2212 and the lowermost roller 2216 are mounted such that they extend along axes located within a plane 2602 parallel to the first sheet 2201. The distance between the inner surface 2501 of the first sheet 2201 and the plane 2602 is chosen to be slightly larger than the radius of the rollers 2212 and 2216, so that a small gap 2603 exists between the second sheet portion 2205 and the inner surface 2501 of the first sheet 2201. For example, in the present embodiment, the distance between the plane 2602 and the inner surface 2501 is 9 mm while the radius of the rollers 2212 and 2216 is 8 mm, so that the width of the gap 2603 is approximately 1 mm.

Similarly, the other two rollers 2217 and 2218, which press against the outside of the third sheet portion 2208, are mounted on axes that lie in a second plane 2604, parallel to the first plane 2602. The rollers 2217 and 2218 are provided with the same sized diameters as the rollers 2212 and 2216, while the plane 2604 is chosen to be slightly further from the first sheet 2201 than is the first plane 2602. Consequently, the third sheet portion 2208 extends between the rollers 2217 and 2218 parallel to the second sheet portion 2205 but spaced apart from it by a small gap 2605. In the present example, the planes 2602 and 2604 are separated by 1 mm and consequently the gap 2605 is approximately 1 mm. As described above, with respect to the first embodiment, this close spacing of the inner surface 2501 of the first sheet 2201, the second sheet portion 2205 and the third sheet portion 2208 allows the width of the low transmittance portions 2203, 2207 and 2210 of the first sheet, second sheet portion and third sheet portion to be kept to a minimum, while ensuring the window unit provides privacy in its closed configuration.

The present embodiment has several advantages when compared to the first described embodiment. Firstly, in the first described embodiment, as shown in FIG. 5, the positioning members 503, 504, 505 and 506 that fixed the position and spacing of the second and third sheet members were provided in the form of static guide rods. Whereas, in the present embodiment each of the positioning members 2212, 2216, 2217, 2218 comprises a roller mounted in bearings such that it is able to rotate about its own axis.

Consequently, frictional forces resisting movement of the second and third sheet portions are reduced. (In the present example, the mounting blocks 2102 and 2103 are formed of a polymer providing a low friction surface for receiving the axles 2214. However, in alternative embodiments, it is envisaged that the axles 2214 will be mounted within roller bearings.)

Secondly, it should be realised that whereas the sheet portions extended around six elements in FIG. 5, in the present embodiment the sheet portions only extend around four elements. This has been achieved by the lowermost roller 2216 and the uppermost roller 2212 being repositioned such that they are able to perform the function of positioning members, fixing the position and spacing of the second sheet portion 2205. Thus, the lowermost roller 2216 performs the functions of (i) guiding the connecting portion 2211 as it extends between the second sheet portion 2205 and 2208, (ii) providing a tensioning force to the connecting portion 2211 and (iii) positioning the second sheet portion 2205. Similarly, the uppermost roller 2212 (a) providing forces to the second sheet portion and third sheet portion for moving the sheet portions during operation, and (b) acts as a positioning member to position the second sheet portion 2205.

In each of the above described embodiments, the first sheet, which defines first high transmittance regions and first low transmittance regions, comprises a sheet of glass. However, in an alternative embodiment the first sheet comprises an additional polymer sheet defining the first high transmittance regions and first low transmittance regions, for example in the form of alternating horizontal stripes. The second sheet portion and the third sheet portion may be formed and mounted as described above for the embodiment of FIGS. 20 to 26. In one embodiment, the first sheet is attached at its lower end to a first supporting member and at its upper end to a second supporting member. The two supporting members having ends located within holes formed in the mounting blocks, which thereby support the supporting members. One of the two supporting members may be spring-mounted to maintain the first sheet in tension and keep it flat. The first sheet and the second and third sheet portions are supported in parallel planes spaced from each other by approximately one millimeters. This close spacing provides good optical characteristics for the window unit (as described with respect to the first embodiment). The first sheet and the second and third sheet portions are supported between two sheets of glass forming outer surfaces of the window unit. The sheets of glass are typically formed of plane transparent toughened glass. Because the sheets of glass are not used to define the low transmittance portions and the high transmittance portions, the polymer sheets defining the first sheet, the second sheet portion and the third sheet may be positioned in planes spaced from the sheets of glass by several millimeters.

One potential advantage of this arrangement is that even if the sheets of glass become temporarily curved, due to expansion caused by heat, or due to changing atmospheric pressure, the three sheets that define the three sets of low and high transmittance regions may be kept flat and parallel. Consequently, the deforming of the glass sheets does not adversely affect the optical properties of the window unit.

The invention claimed is:

1. A window unit, comprising:
   a first sheet defining first high transmittance regions and first low transmittance regions;
   a second sheet portion positioned substantially parallel to said first sheet, said second sheet portion defining second high transmittance regions and second low transmittance regions;
   a third sheet portion positioned substantially parallel to said second sheet portion, said third sheet portion defining third high transmittance regions and third low transmittance regions;
   an actuation device configured to simultaneously move said second sheet portion and said third sheet portion from an open configuration, in which said second and third high transmittance regions are aligned with said first high transmittance regions, to a closed configuration, in which said second high transmittance regions are not aligned with said first high transmittance regions and said third high transmittance regions are not aligned with said first or second high transmittance regions; and
   at least four positioning members comprising: a first upper positioning member, a second upper positioning member, a first lower positioning member, and a second lower positioning member, wherein:
   said second sheet portion extends along a plane defined by said first upper positioning member and said first lower positioning member, is arranged substantially parallel to said third sheet portion, and is connected to said third sheet portion by a connection portion comprising a flexible sheet material,
   said third sheet portion extends along a plane defined by said second upper positioning member and said second lower positioning member so that said second sheet portion is positioned substantially parallel to, and spaced apart from, said third sheet portion and said first sheet, and
   said connection portion extends around at least one guide member defining a path along which the connection portion is moveable, the guide member comprising one of said positioning members.

2. The window unit according to claim 1, wherein said second and third sheet portions are different portions of a single sheet of material.

3. The window unit according to claim 1, wherein:
   said second sheet portion extending between said first upper positioning member and said first lower positioning member is arranged to move relative to said first sheet in a first direction, and
   said third sheet portion extending between said second upper positioning member and said second lower positioning member is arranged to move relative to said first sheet in a second direction opposite to said first direction.

4. The window unit according to claim 1, wherein each of said positioning members is mounted to rotate about a respective axis such that said positioning members rotate during movement of said second sheet portion and said third sheet portion.

5. The window unit according to claim 4, wherein:
   said actuation device comprises a rotatable drive element, and
   said rotatable drive element also provides one of said rotatable positioning members.

6. The window unit according to claim 1, wherein said actuation device is configured to move said second sheet portion in one direction and move said third sheet portion in an opposite direction.

7. The window unit according to claim 1, wherein:
   said actuation device comprises a rotatable drive element extending along an axis of rotation, and
   each said sheet portion has a first end attached to said drive element such that rotation of said drive element causes said first sheet portion to move in one direction and causes said second sheet portion to move in an opposite direction.

8. The window unit according to claim 7, wherein:
   said rotatable drive element has a cylindrical outer surface, and
   said second and third sheet portions each have an attachment portion extending around said cylindrical outer surface.

9. The window unit according to claim 1, wherein said first sheet portion, said second sheet portion and said connection portion are portions of a single sheet of material.

10. The window unit according to claim 1, further comprising a spring configured to urge said guide member to push against said connection portion so that said second and third sheet portions are held in tension.

11. The window unit according to claim 1, wherein:
    said first low transmittance regions are in the form of a first set of stripes extending across the width of said first sheet, and
    said second and third low transmittance regions are in the form of respective second and third sets of stripes arranged parallel to said first set of stripes.

12. The window unit according to claim 11, wherein at least one of said first, second and third sets of stripes comprise stripes each having varying transmittance across their respective widths.

13. The window unit according to claim 12, wherein said varying transmittance is produced by a printed pattern.

14. The window unit according to claim 1, wherein said first, second and third high transmittance regions are see-through to allow viewing though said window unit when said unit is in said open configuration.

15. The window unit according to claim 1, wherein said first, second and third low transmittance regions are see-through to allow viewing through said window unit when said unit is in said closed configuration.

16. The window unit according to claim 1, wherein:
    said second sheet portion and said third sheet portion are formed of a continuous loop of material, and
    the actuation device is configured to drive the continuous loop of material by friction, or mechanical interaction, between the actuation device and the continuous loop of material.

17. The window unit according to claim 16, wherein the continuous loop of material is driven by said actuation device by frictional force.

18. The window unit according to claim 16, wherein:
    the second sheet portion has a first set of low transmittance regions having a first appearance and a second set of low transmittance regions having a second appearance different to said first appearance, and the third sheet portion has a third set of low transmittance regions having a third appearance and a fourth set of low transmittance regions having a fourth appearance different to said third appearance.

19. The window unit according to claim 18, wherein the first sheet has a fifth set of low transmittance regions having a fifth appearance and a sixth set of low transmittance regions having a sixth appearance different to said fifth appearance.

20. The window unit according to claim 1, wherein at least one of the first upper positioning member, the second upper positioning member, the first lower positioning member, and the second lower positioning member extends across a center of at least one of the first sheet, second sheet portions, and third sheet portion in a width direction that is orthogonal to an upper-lower direction.

21. The window unit according to claim 1, wherein the first upper positioning member, the second upper positioning member, the first lower positioning member, and the second lower positioning member are separate from each other.

22. The window unit according to claim 1, wherein the first sheet is between the first upper positioning member and the first lower positioning member.

23. The window unit according to claim 1, wherein:
at least one of the first and second upper positioning members is above the first sheet, and
at least one of the first and second lower positioning members is below the first sheet.

\* \* \* \* \*